INVENTOR.
NATHAN GOROS
BY
ATTORNEYS

Fig. 3.

INVENTOR.
NATHAN GOROS
BY
ATTORNEYS

Jan. 3, 1967  N. GOROS  3,295,998
APPARATUS FOR PREPARING AND DISPENSING HOT POTABLES
Filed May 28, 1962  11 Sheets-Sheet 4
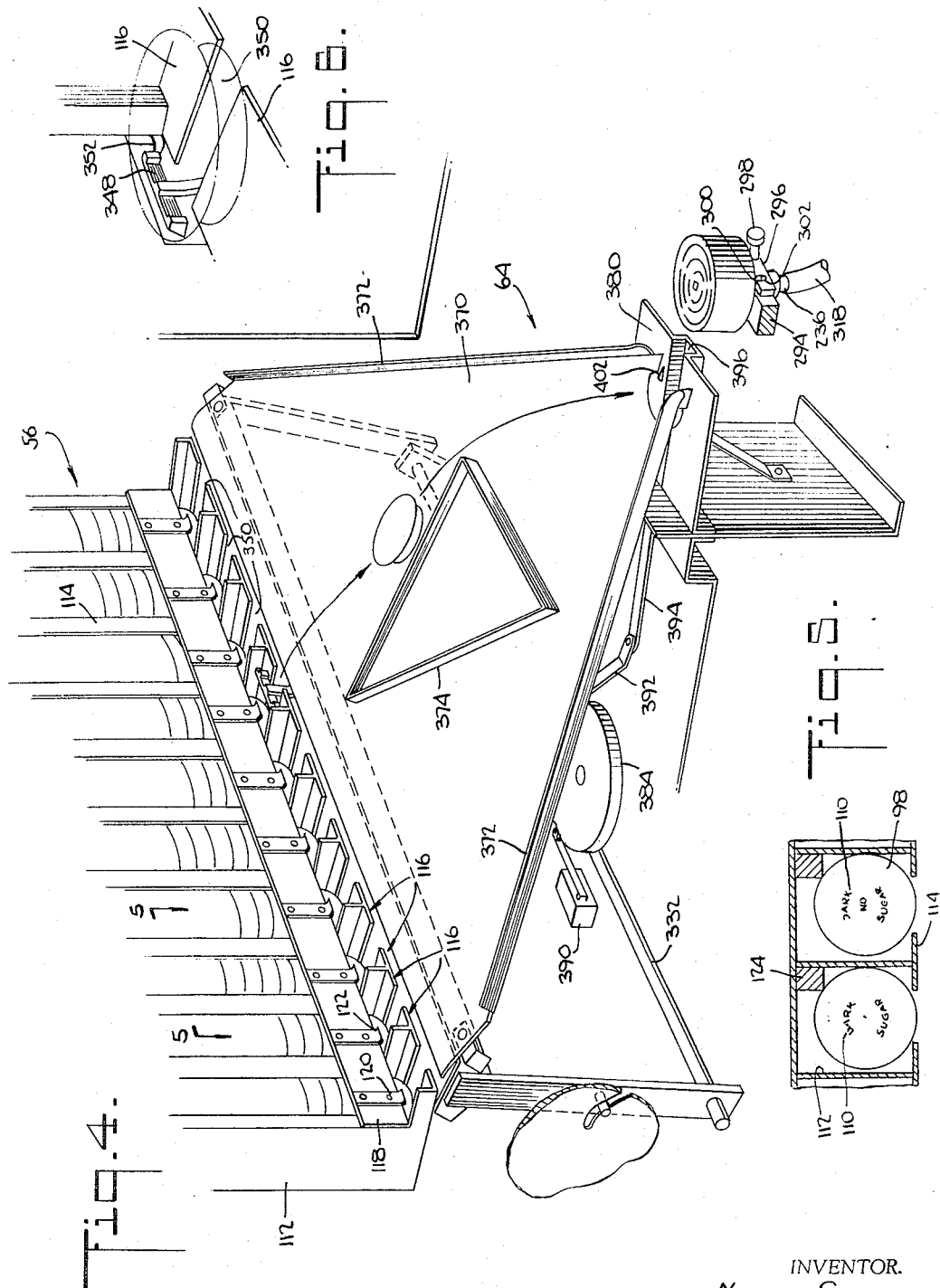
INVENTOR.
NATHAN GOROS
BY
ATTORNEYS Jan. 3, 1967  N. GOROS  3,295,998
APPARATUS FOR PREPARING AND DISPENSING HOT POTABLES
Filed May 28, 1962  11 Sheets-Sheet 5
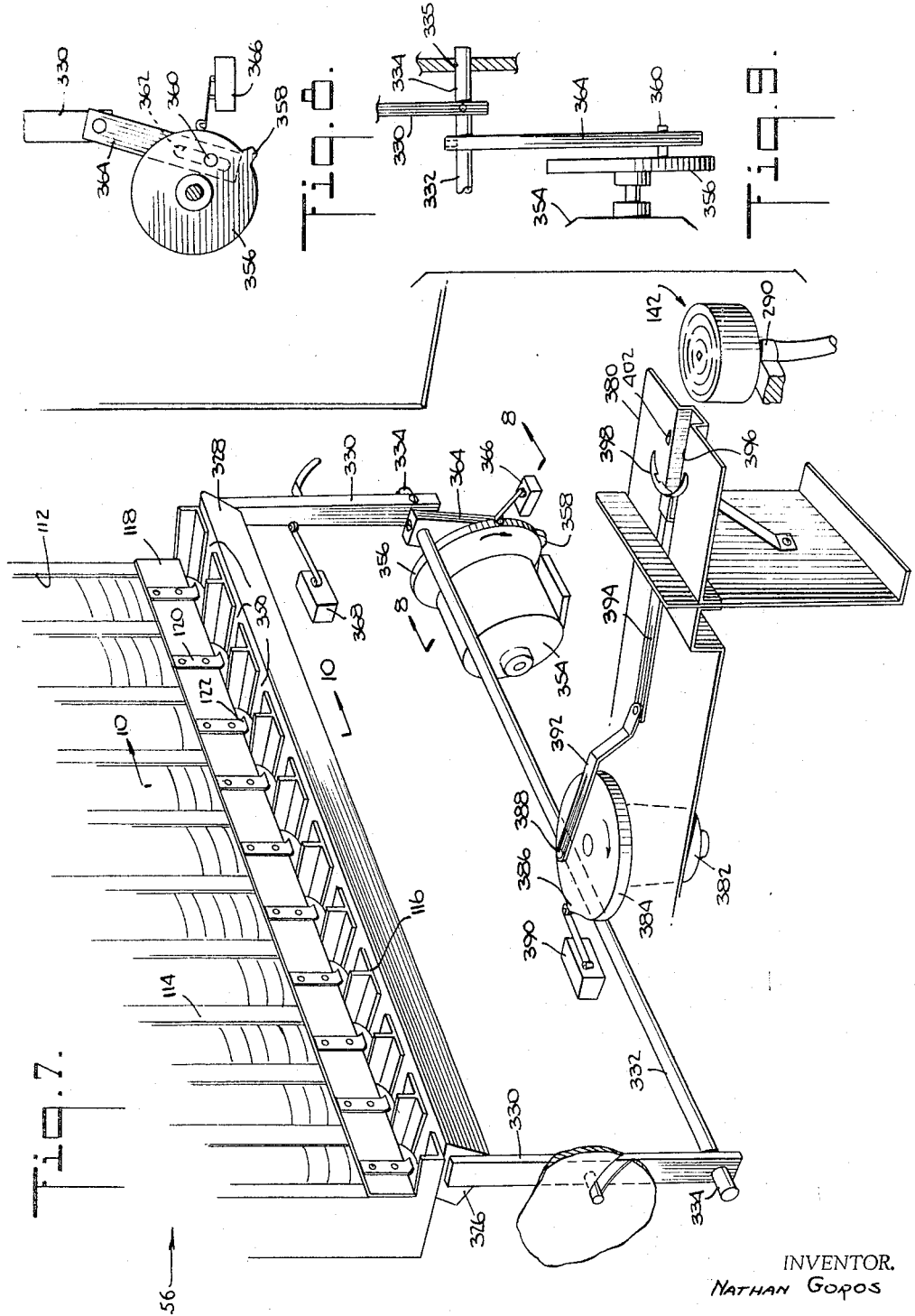
INVENTOR.
NATHAN GOROS
BY
ATTORNEYS

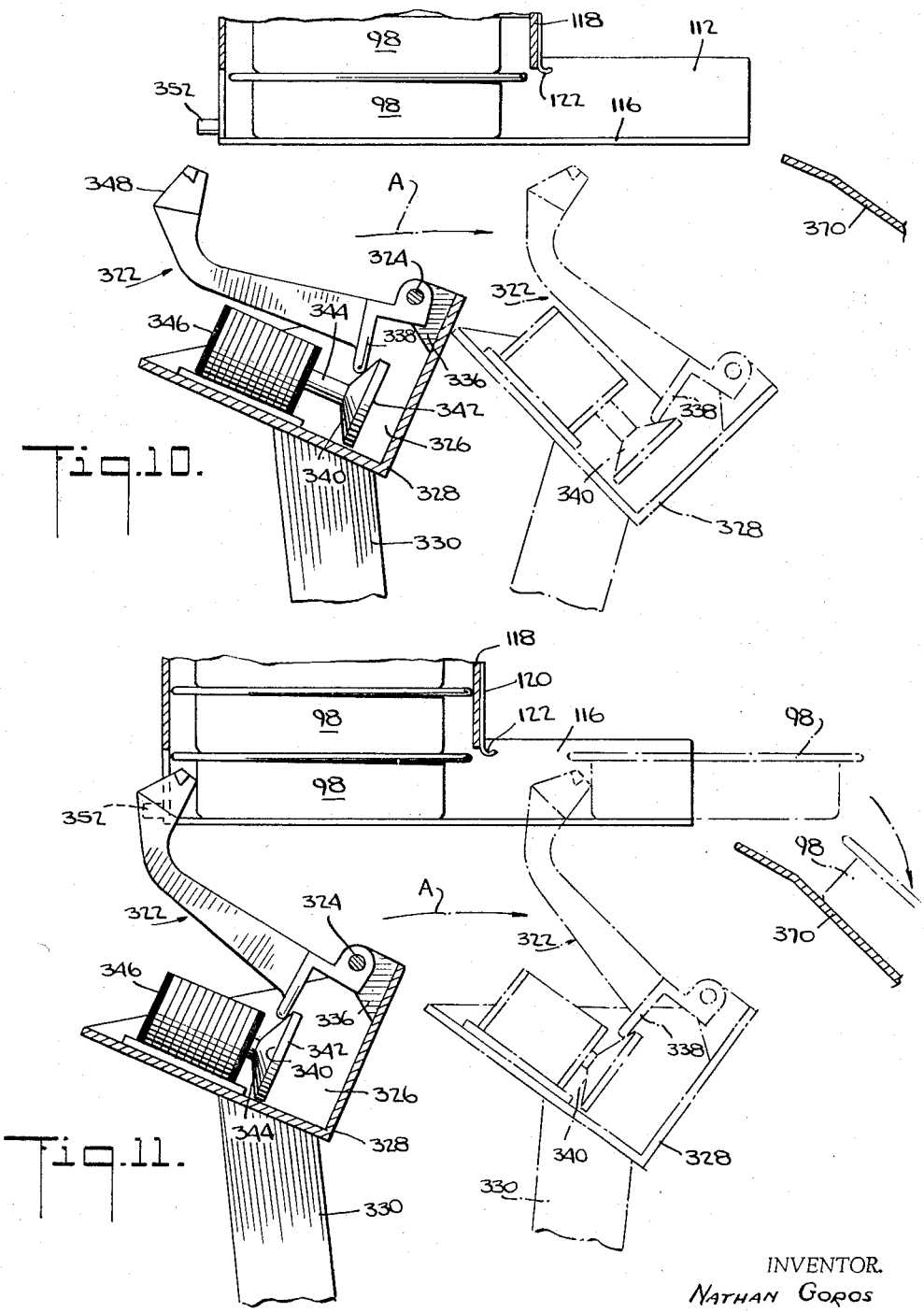

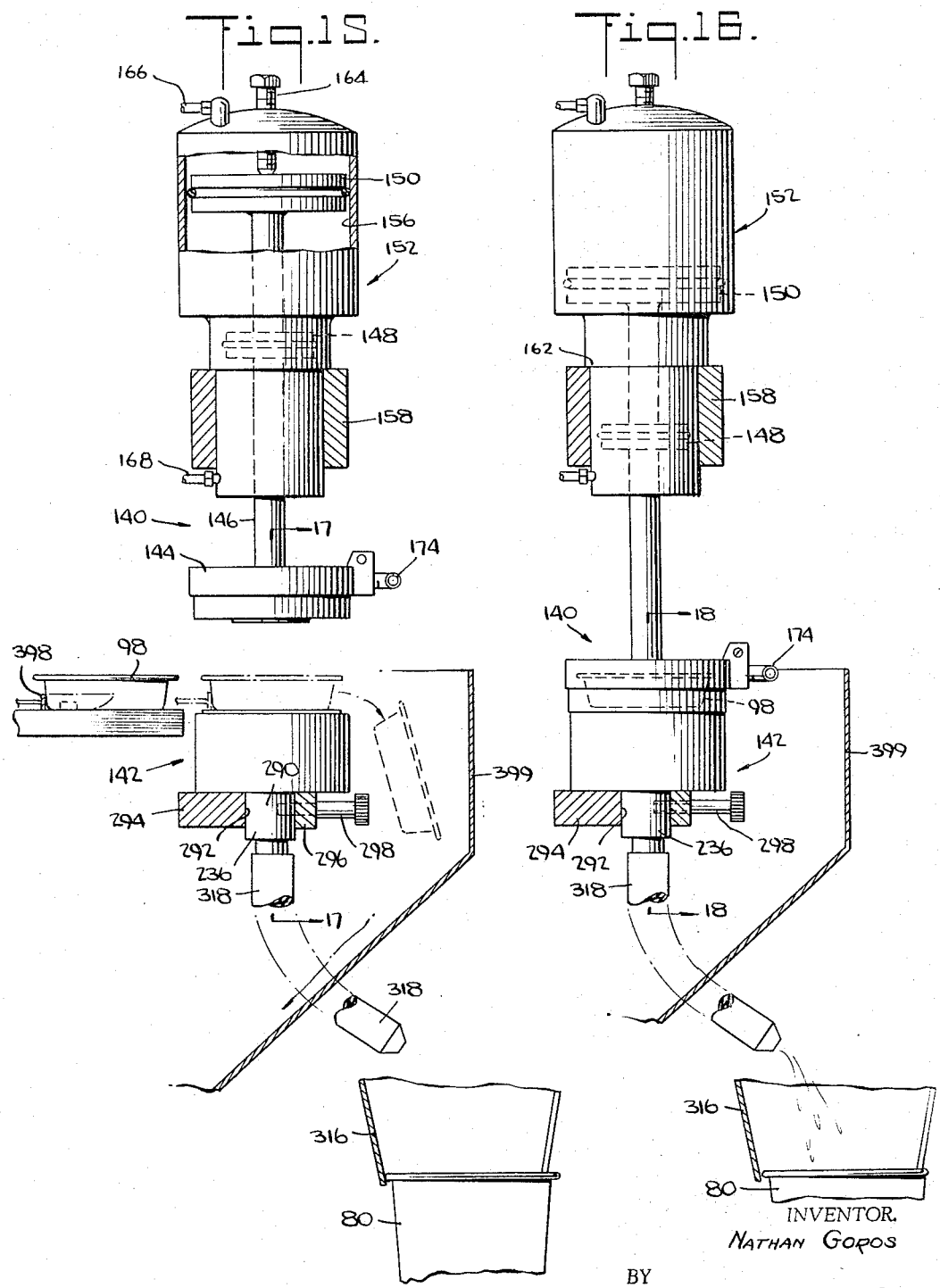

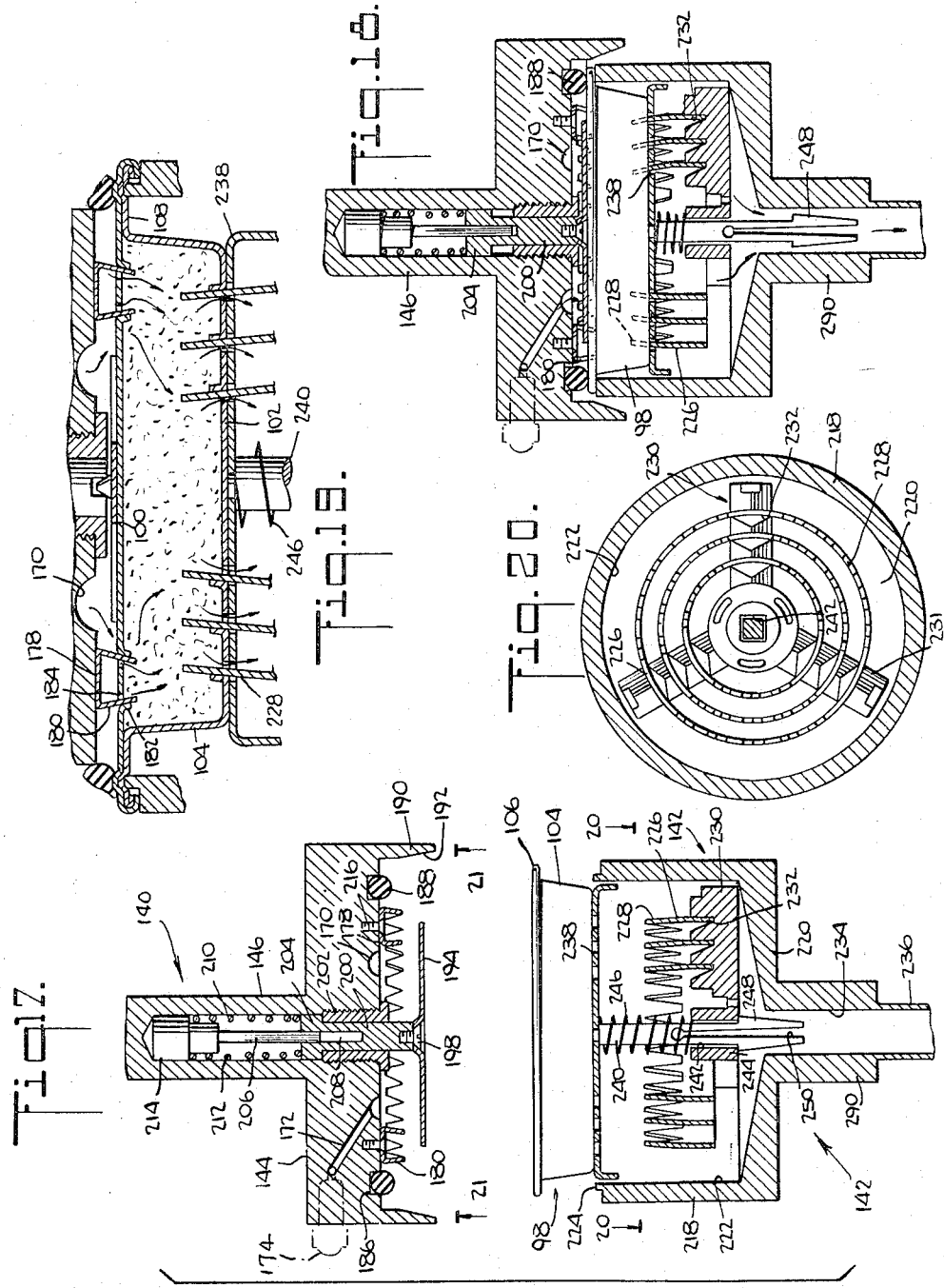

Jan. 3, 1967　　　　　N. GOROS　　　　　3,295,998
APPARATUS FOR PREPARING AND DISPENSING HOT POTABLES
Filed May 28, 1962　　　　　　　　　　　　　　　11 Sheets-Sheet 9
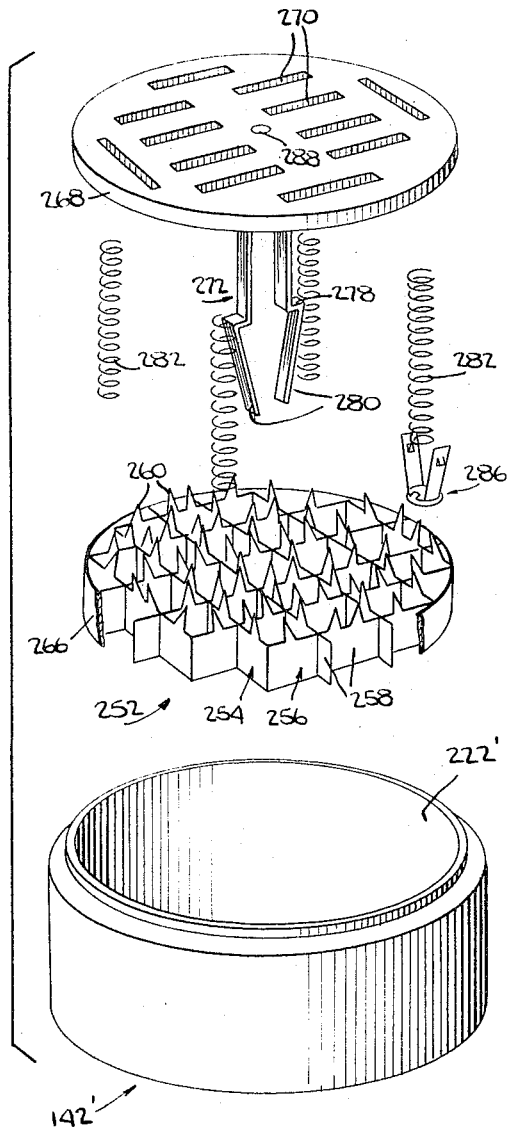
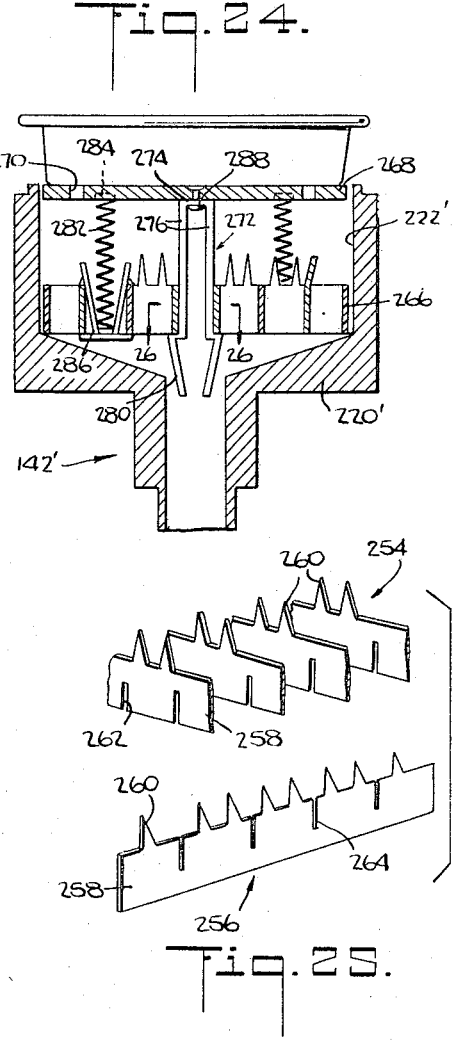
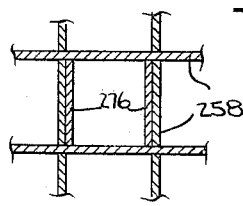
INVENTOR.
NATHAN GOROS
BY
ATTORNEYS

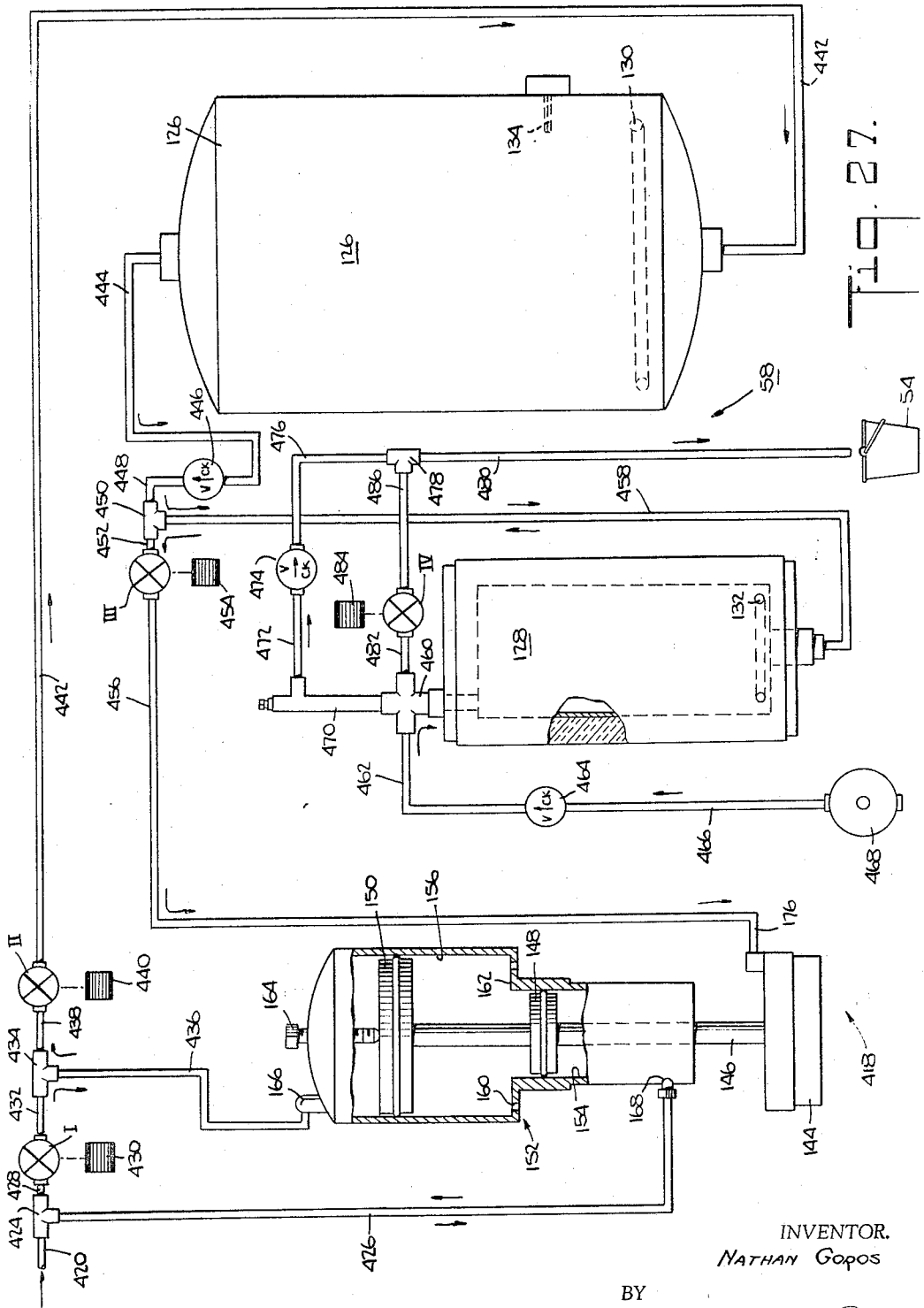

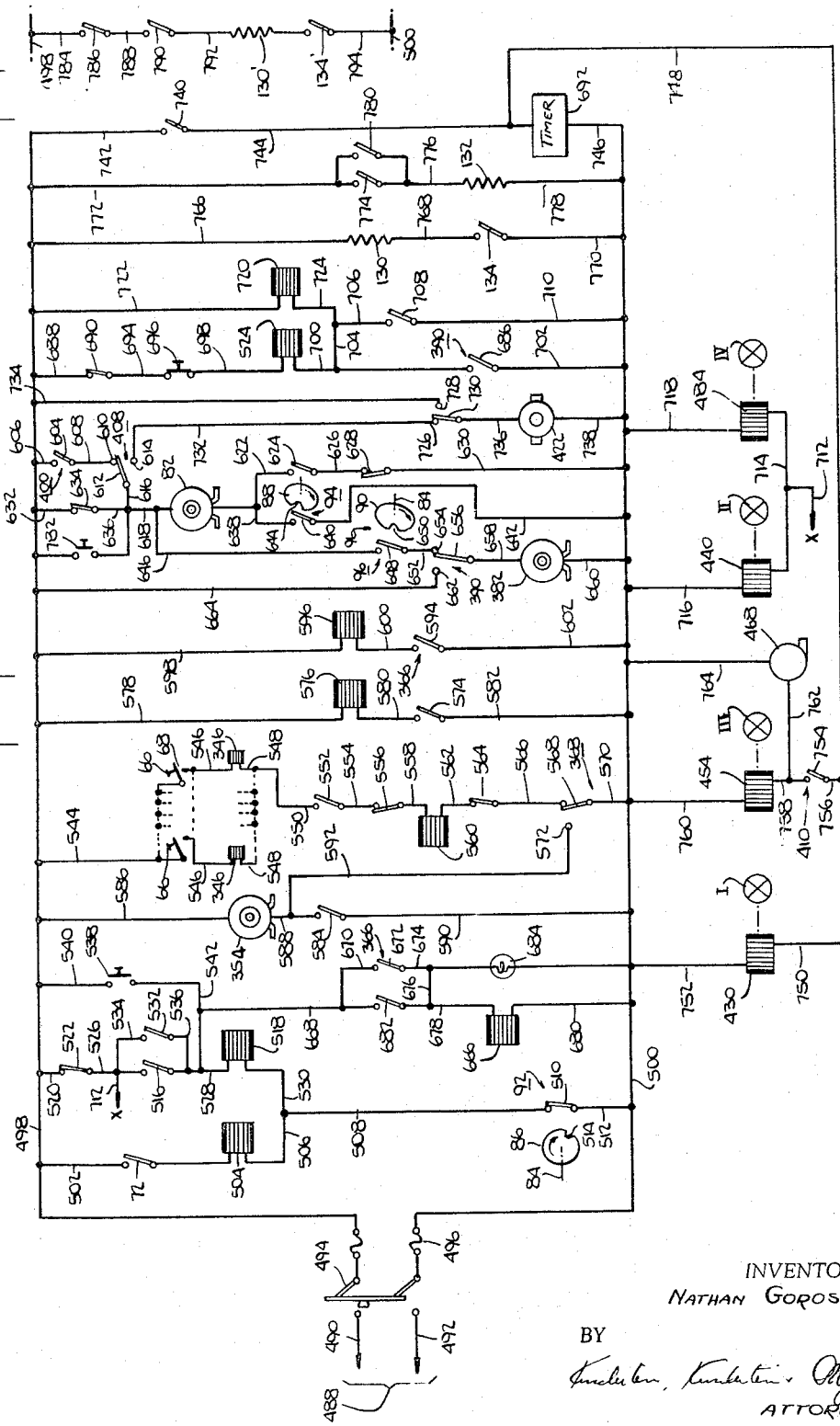

United States Patent Office 3,295,998
Patented Jan. 3, 1967

3,295,998
APPARATUS FOR PREPARING AND DISPENSING
HOT POTABLES
Nathan Goros, Manhattan, N.Y. (% Vendcor, Inc.,
2641 Decatur Ave., Bronx, N.Y. 10458)
Filed May 28, 1962, Ser. No. 197,988
31 Claims. (Cl. 99—282)

This invention relates to an apparatus for preparing and dispensing hot potables.

Although in the preferred form of my invention hereinafter illustrated and described, the apparatus is disclosed as a coin controlled automatic vending machine for hot coffee it will be understood that such showing is simply by way of example since said apparatus is adapted without alteration to vend other hot potables such for instance as tea, chocolate, cocoa, soup, etc., and, moreover, if desired, to dispense any of these hot potables without recourse to coin control and without recourse to automatic cycling.

Present day machines employed for preparing and vending coffee and other hot potables are subject to many drawbacks which, until now, have restrained their unqualified commercial acceptance. A great many devotees of favorite hot beverages willingly would purchase the same throughout the day from any conveniently located vending machine provided that the beverage could be supplied at a reasonable price comparable with that set by eating establishments and provided further that the beverage thus supplied had a consistently good quality which compared favorably with that to which they had become accustomed.

However, for various reasons, the quality and, particularly the taste, of hot potables dispensed by vending machines has not approached that to which the public has become schooled, i.e., that of a home prepared potable. One of the reasons for this deficient quality is that in some machines the potable is brewed (infused) in batches of several, often as many as twenty, cups at a time and a brewed batch is permitted to stand, as will occur upon occasion with vending machines, for so long a period that the flavor will suffer.

Other machines held a large standby quantity of very hot (at least 200° F.) water ready for immediate brewing or infusing and used such standby water to prepare individual servings of a beverage as required. In these cases too the flavor suffered because when a large quantity of water is allowed to stand at very high temperatures (near boiling) for appreciable periods of time it becomes deaerated and a beverage brewed therefrom has a flat taste.

Moreover, the maintenance of a large mass of water at high temperatures has other drawbacks. For instance, keeping a large body of water at a temperature near boiling is attended by the ever present danger of explosion and indeed this has occured all too often. Furthermore, in hard water areas there is an appreciable deposition of salts from a large quantity of water kept for appreciable periods of time at a high temperature. This condition, usually referred to as "liming," requires additional care and maintenance of the equipment.

Another factor that adversely effects the quality of hot potables is taste interference from elements of previously dispensed units of the beverage or from remnants of the flavoring matter from which previously dispensed units were prepared. This taste interference may not be markedly noticeable immediately after cleaning or where a more or less steady demand is imposed upon the vending machine; however it becomes apparent unless the machine is cleaned at the end of every day or at 24-hour intervals and also is evident when the machine is used after standing idle for an appreciable period, say an hour or longer. Over and above the taste interference these remnants raise a problem of sanitation.

Both sanitation and taste interference in present-day machines are offset to some degree by cleaning the vending machines thoroughly at the end of each business day or at other suitable times; however the cost for such upkeep has proven to be very high inasmuch as a conventional current vending machine needs from twenty-five minutes to forty-five minutes or more for cleaning and sanitation.

Another difficulty experienced in connection with deterioration of flavor is the improper application of water pressure to the flavoring material from which the hot potable is brewed. For example, with certain potables, e.g., coffee brewed from ground beans, it is highly desirable, and it is customary in the home, to wet down the ground beans with hot water before circulating hot water through the same. However in single cup brewing type vending machines such wetting down is not practised and it is conventional suddenly to force a slug of hot water through the ground beans without a preliminary slow wetting of the beans.

It is an object of my invention to provide an apparatus of the character described which is not subject to any of the foregoing drawbacks and which has a great many advantages over existing and heretofore proposed machines for preparing hot potables, these advantages extending to all aspects of vending machines, including, for example, cost, maintenance, trouble-free operation, sanitation and taste.

It is another object of my invention to provide a hot potable preparing apparatus which will secure a consistently uniform desirable taste for the beverage.

It is another object of my invention to provide an apparatus of the character described which will prepare hot beverages quickly and economically.

It is another object of my invention to provide an apparatus of the character described which has comparatively few parts and which is easy and inexpensive to build and service.

It is another object of my invention to provide an apparatus of the character described which will function with a small quantity of standby (reserve) heated water so that if, through malfunctioning of the apparatus, the container in which the standby water is disposed should explode, damage will be held to a minimum.

It is another object of my invention to provide an apparatus of the character described in which the standby (reserve) heated water is maintained at a temperature considerably below the boiling point so that deaeration and liming are materially reduced.

It is an ancillary object of my invention to provide an apparatus of the character described in which there is associated with the standby heated water a topping or flash heater of high caloric capacity, i.e., a rapid heater which can be used to quickly raise the mildly preheated standby water to a temperature sufficiently high for preparation of the hot potable, thereby reducing the time for liming and deaeration to such an extent that they no longer are noticeable.

It is another object of my invention to provide an apparatus of the character described including a reserve heating tank and an auxiliary heating tank in which the heaters for the two tanks are so electrically wired as not to require connection to a heavy-duty convenience outlet.

It is another object of my invention to provide an apparatus of the character described in which the metering of the heated water is performed in such a fashion that the slug of high temperature water does not present a steep gradient pressure front as it meets the flavoring material from which the potable is to be prepared, e.g., ground coffee beans, tea leaves, dry concentrate or syrup.

It is another object of my invention to provide an apparatus of the character described in which pneumatic pressure is employed for metering purposes so that the force driving the slug of high temperature water through the flavoring material is elastic whereby to slow down the wetting of such material and reduce the shock on such material and thus not tend to drive any particle thereof to the dispensing spout, and which apparatus, by reducing the shock, lessens the physical stresses on the various mechanical components including the pellet which contains the flavoring material.

It is another object of my invention to provide an apparatus of the character described having an arrangement which effectively removes the remnants of each batch of hot potable present in the apparatus after every dispensing operation so as to avoid taste interference thereby and so as to reduce the problem of sanitation.

It is another object of my invention to provide an apparatus of the character described wherein the metering is performed pneumatically in a fashion such that accumulation of residues of the potable in the apparatus is discouraged, thereby very greatly reducing the amount of time required for maintenance and cleaning and also making the machine far more sanitary so that there is appreciably less danger of food poisoning.

It is another object of my invention to provide an apparatus of the character described having an improved metering system in which there is an auxiliary container for heated water to be used in exactly the amount required to be dispensed so that pump displacement or valve metering with their consequent high cost and high maintenance are eliminated.

It is another object of my invention to provide an apparatus of the character described for preparing hot potables in which a flavoring-material-containing pellet is pierced in a novel and simple manner with the aid of apparatus that is durable and rugged and which can be cleaned efficiently, thoroughly and rapidly by maintenance men.

It is another object of my invention to provide an apparatus of the character described for preparing a hot potable in which the flavoring-material-containing pellet is pierced by hydraulic means which, at least in part, forms an element of the metering system whereby the number of parts used in the apparatus is kept at a minimum and the metering considerably simplified.

It is another object of my invention to provide an apparatus of the character described having a highly simplified hydropneumatic meternig system which is positive, accurate and speedy in operation and which can be manufactured at a low cost.

It is another object of my invention to provide an apparatus of the character described employing a simplified electric cycling control which, with comparatively few parts, automatically regulates the operation of the various parts of the apparatus.

It is another objects of my invention to provide an apparatus of the character described in which a selection is provided for the user among several types of different potables each time the apparatus is operated such, for example, as: unsweetened black coffee, sweetened black coffee, unsweetened coffee with a normal amount of creaming agent, sweetened coffee with a normal amount of creaming agent, unsweetened light coffee, and sweetened light coffee.

It is another object of my invention to provide an apparatus of the character described in which improved means is provided for handling and guiding the flavoring-material-containing pellets so that the position of a selected pellet is positively controlled over all the various parts of its path of travel.

It is another object of my invention to provide an apparatus of the character described which, despite its proper handling of the flavoring material with respect to gradual initial application of hot water thereto, nevertheless has a fast cycle for preparing the hot potable so that the apparatus will not require too long a wait by a customer for successive individual portions of hot potables.

It is another object of my invention to provide an apparatus of the character described which employs a pneumatic pump for expediting the metering of the hot water and of the hot potable whereby the speed of the cycle can be set to any desired time as, for example, well under fifteen seconds.

It is another object of my invention to provide an apparatus of the character described having an auxiliary hydraulic pump whereby to insure positive operation of the machine in the event that local water (tap) pressure is too low.

It is another object of my invention to provide an apparatus of the character described in which mechanical failure of the metering system is largely obivated through the use of pnuematic pressure which avoids, for example, such possible sources of failure as deterioration of O-rings, washers and packing glands, in contact with hot water.

Other objects of my invention in part will be obvious and in part will be pointed out hereinafter.

My invention accordingly consists in the features of construction, combinations of elements and arrangements of parts which will be exemplified in the machine hereinafter described and of which the scope of application will be indicated in the appended claims.

In the accompanying drawings, in which I have shown various possible embodiments of my invention, FIG. 1 is a front perspective view of an automatic hot potable vending machine constructed in accordance with and embodying my invention;

FIG. 3 is an enlarged fragmentary view of the brewing station and the parts of the machine adjacent thereto;

FIG. 4 is an enlarged perspective view of the several stacks of different flavoring-material-containing pellets in the magazine and of the mechanical arrangement for pushing a single pellet at a time from a selected stack and guiding and "kicking" it to the brewing station;

FIG. 5 is a sectional view taken substantially along the line 5—5 of FIG. 4;

FIG. 6 is a detail perspective view illustrating a pusher locked in ejecting condition;

FIG. 7 is a view similar to FIG. 4 but with some portions of the machine removed, in order to better illustrate details of other portions;

FIG. 8 is a sectional view taken substantially along the line 8—8 of FIG. 7 and illustrating the linkage employed to actuate the pusher carriage;

FIG. 9 is a side elevational view of the linkage shown in FIG. 8;

FIG. 10 is a detail sectional viewing showing in full and phantom lines, respectively, the rearmost and an advancing position of a pusher in non-ejecting condition;

FIG. 11 is a view similar to FIG. 10 but showing the rear and an advancing position of a pusher in ejecting condition;

FIG. 12 is a front-to-back vertical sectional view taken through the front end of the pellet delivery gravity chute, the kicker and the kicker platform, the kicker being illustrated in its retracted position;

FIG. 12A is a top plan view of the discharge end of the pellet delivery chute;

FIG. 13 is a view similar to FIG. 12 but showing the kicker in a partly advanced position;

FIG. 14 is a sectional view taken substantially along the line 14—14 of FIG. 13;

FIG. 15 is a front view in partial section of the brewing station, the brewing ram and jaw being illustrated in elevated position;

FIG. 16 is a view similar to FIG. 15, but illustrating the brewing ram and jaw in lowered (closed) position;

FIG. 17 is an enlarged sectional view taken substantially along the line 17—17 of FIG. 15;

FIG. 18 is an enlarged sectional view taken substantially along the line 18—18 of FIG. 16;

FIG. 19 is a fragmentary sectional view of a portion of FIG. 18 but to a larger scale and showing the pellet in section whereby the perforating action of the pellet piercing tines can be more readily seen and understood;

FIG. 20 is a sectional view taken substantially along the line 20—20 of FIG. 17, and showing a top plan view of the piercing tines of the brewing anvil;

FIG. 21 is a bottom plan view of the brewing ram, the same being taken substantially along the line 21—21 of FIG. 17;

FIG. 22 is a perspective view of a flavoring-material-containing pellet;

FIG. 23 is an exploded perspective view of a modified form of brewing anvil, the same employing a crossed interlocked partition type of piercing tine matrix;

FIG. 24 is a vertical central sectional view through the brewing anvil shown in FIG. 23, the same being illustrated in assembled condition;

FIG. 25 is an exploded view of the partition components of the piercing tine matrix of FIG. 23;

FIG. 26 is an enlarged fragmentary sectional view taken substantially along the line 26—26 of FIG. 24;

FIG. 27 is a schematic diagram of the hydroneumatic circuit of the machine embodying my invention;

FIG. 28 is a schematic diagram of the electric cicrcuit of said machine; and

FIG. 29 is a schematic diagram of a portion of a modified circuit for said machine.

Figure 1:
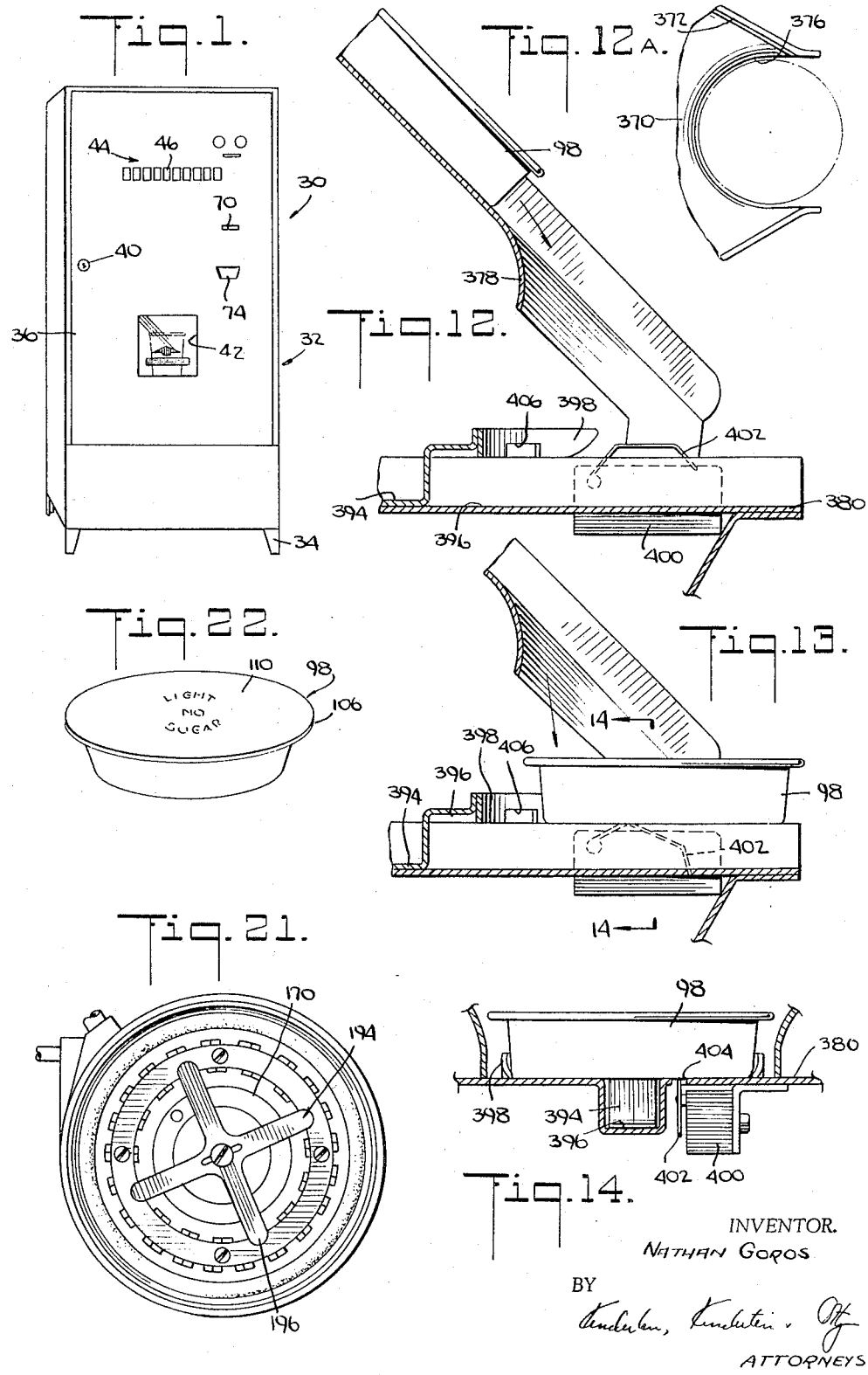

Referring now in detail to the drawings, the reference numeral 30 denotes a hot potable vending machine constructed in accordance with and embodying my invention.

The machine has an outer casing or shell 32 which may be of any suitable configuration that is aesthetically attractive and which supports within it the various components for preparing and dispensing hot potables. Said casing has been illustrated in a configuration which is currently fashionable, this constituting a rectangular parallelepiped which is vertically elongated and is wider than it is deep. The casing stands on legs 34 and its front is constituted by a door 36 which is attached to the casing body in any suitable manner, as for instance, by hinges 38. The door is provided with a lock 40 so that when closed no unauthorized person may tamper with the working parts of the machine.

The major operating components of the machine are enclosed within the casing, the only public access to the interior being through a removal aperture 42 in the door. The aforesaid components include: a group 44 of selector buttons 46, a coin actuated switch assembly 48, a cup dispensing mechanism 50, a relay and timer assembly 52, a waste container 54, a pellet magazine 56, a water heating station 58 (see FIG. 3), a brewing station 60, a dispensing station 62 and a pellet transfer mechanism 64 (see FIG. 4). Various motors and pumps also are housed in the casing 32 but have not been shown, except diagrammatically in FIGS. 27 and 28, since their specific physical constructions, configurations and locations are of no importance.

Figure 2:
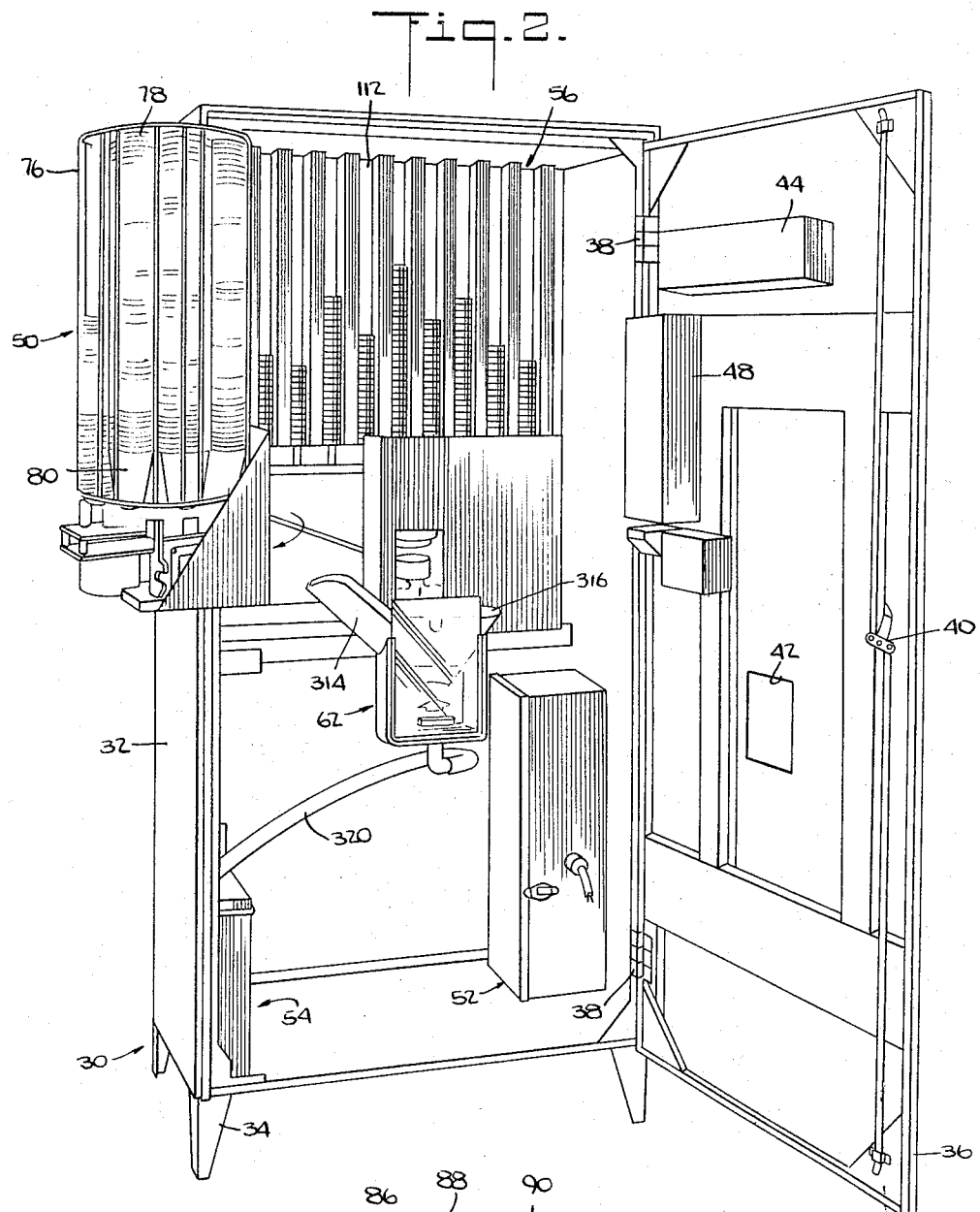
FIG. 2 is a larger front perspective view of the machine, the same being illustrated with the front panel open and with the cup dispensing mechanism swung out in order to show the locations and general outlines of the various operating parts of the heating and brewing stations.

The group 44 (see FIGS. 1 and 2) of selector push buttons consists of a row of button heads 66 (see FIG. 28) which are mounted on the door and are accessible at the exterior of the casing so that any button can be selectively depressed by a purchaser. Each button corresponds to a different stack of pellets in the magazine and each button controls a different normally open pair of switch contacts 68 all of which are connected in parallel.

The coin actuated switch assembly 48 (FIG. 2) is of standard construction and likewise is mounted on the door 36. It is adapted to receive coins inserted through a drop slot 70 (see FIG. 1) in the door and it includes the usual selection mechanism for rejecting spurious coins and for closing a normally open momentary switch 72 (see FIG. 28) when a coin or coins of the proper denominations have been placed in the slot. The coin assembly 48 further includes a reject chute 74 for the discharge of spurious coins, coins of the improper denomination, or coins when the supply of pellets is exhausted. The internal construction of the coin actuated switch assembly 48 has not been illustrated inasmuch as it is conventional and is employed on a great number of presently used coin controlled vending machines.

The cup dispensing mechanism 50 (FIG. 2) likewise is conventional and therefore will not be described in detail. Said mechanism is mounted as a unit on the inside of the casing 32 and is secured to the casing by hinges having vertical pintles so that when the door 36 is opened the cup dispensing mechanism can be swung out for filling or servicing. As is well known, the cup dispensing mechanism includes a cage 76 which is mounted to turn about a vertical axis and which contains several vertical stacks 78 of cups 80. The cups likewise are of conventional construction, constituting frusto conical side walls and imperforate bottom walls so that the cups can be nested. Cups are sized with a suitable material to render them impervious to hot potables.

Figure 2A:
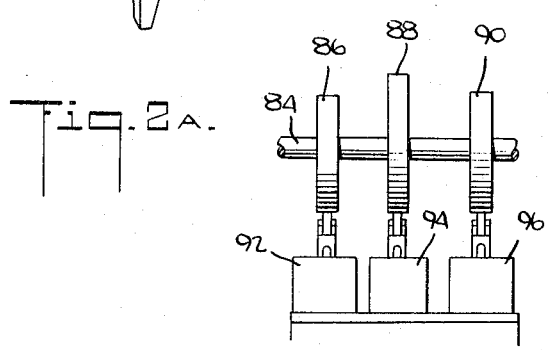
FIG. 2A is a detail view of the cams and associated switches that are operated by the cup dispensing motor.

The cup dispensing assembly is a single cycle mechanism. That is to say, when actuated it will perform a cycle of operations resulting in the discharge of a single cup and then will stop. The cup dispensing mechanism is powered by a cup dispensing motor 82 which can not be seen in FIG. 2 since it is hidden behind the cage; however it is indicated on the electric circuit diagram of FIG. 28. For cycling, timing and synchronizing purposes the cup dispensing motor 82, in addition to powering the cup dispensing mechanism 50, turns a cam shaft 84 (see FIG. 2A) on which there are mounted a group of cams, 86, 88, 90. The cam 86 cooperates with a momentary switch 92 having a normally open pair of contacts 510 (FIG. 28) in the circuits for the anti jackpot relay coil 504 and the vend relay coil 518. The cam 88 cooperates with a momentary switch 94 having a normally open pair of contacts 640 in the hold circuit for the cup dispensing motor 82. The cam 90 cooperates with a momentary switch 96 having a normally open pair of contacts 648 in the make circuit for the kicker motor 382.

The relay and timer assembly 52 contains a large group of electrical relays and a timer. All of these will be described in detail with respect to the circuit diagram of FIG. 28.

The waste container 54 simply is a bucket (FIGS. 2 and 27) located at some low point within the casing and which accumulates overflow of liquids from various sources which will become apparent as this description proceeds. The bucket is intended to be emptied from time to time and I have found that when the machine is properly adjusted the amount of overflow liquid is negligible.

The pellet magazine 56 comprises a source of supply for various flavoring-material-containing pellets 98 which desirably have different contents. The pellets preferably are arranged in various stacks with all the pellets of each stack having the same type of flavoring-containing-material. For example, the pellets in one stack may contain the proper type of flavoring material to brew only strong black unsweetened coffee, the pellets in another stack may have the proper material to brew black sweetened coffee. These latter pellets contain sugar or an artificial sweetener in addition to coffee flavoring or brewing material.

In another stack the pellets may contain a creaming agent as well as ground coffee beans and these pellets will produce either a light cup of coffee, or a cup of coffee with a normal amount of creaming agent, or a cup of coffee with more than a normal amount of creaming agent. Any one of these pellets either may or may not have sugar. In addition to the different types of pellets mentioned, extra stacks may be provided for pellets of the faster selling types.

The individual pellets 98 (FIG. 22) are characterized by the provision of a hollow container, preferably with a flat top wall 100 (see FIG. 19) and a flat bottom wall 102, the side wall 104 may be circular, optionally being frusto conical. The side wall is joined to the top wall by a flat outwardly protruding horizontal flange 106 (see FIGS. 17 and 22) which desirably lies in substantially the plane of the top wall. The walls of the pellet and at least the top and bottom walls are made of a thin frangible material which is inert to food products and is unaffected by temperatures up to the boiling point of water and which also has sufficient strength to maintain the shape of the pellet under the internal pressure to which they will be subjected, in the order, for example, of up to 30 p.s.i. The pellets also should be able to withstand external pressures in the nature of those engendered during handling, transfer and piercing. Pellets of the foregoing nature are well known, being described, for example, in my United States Letters Patent No. 2,968,560 for "Infusion Packaging for Producing a Coffee Beverage," dated January 17, 1961. The walls of said pellet may be made from metal foil or a plastic sheet material which will withstand the pressures and temperatures that I have mentioned. However, in the preferred form of my invention the pellet is made of aluminum foil in the order of about three thousands of an inch thickness.

The top wall 100 of the pellet is joined to an outwardly extending lip 108 integral with the upper edge of the side wall 104 so that the contents of the pellet are hermetically sealed from the atmosphere so long as the pellets are located in the magazine 56.

To facilitate servicing of the machine some part of each pellet, e.g., the top wall, bears an external marking to indicate the nature of the beverage which will be made with the aid of the pellet. Such a marking 110 is illustrated in FIG. 22, the same reading "light-no sugar," an indication that the beverage brewed with this particular pellet will be unsweetened and will have more than a normal amount of creaming agent.

Within the pellet I provide a metered amount of dry-particulate (e.g., powder, granules, crystals or shredded leaves) flavoring material. When making coffee I prefer that this flavoring material be ground coffee beans, although I do not wish to exclude the use of decaffeinized ground coffee beans or crystals of coffee flavor. Nevertheless, I have found that most people prefer coffee which is brewed, that is to say, that which is extracted, from ground coffee beans rather than coffee which is made by dissolving extracted coffee crystals in hot water; and accordingly the design of the present machine is such that it can perform the more onerous brewing (infusing) operation, although the machine is so constructed that it also will dissolve extracted coffee crystals if the same should be present.

I also should mention that the material from which at least the top and bottom walls of the pellet are fabricated are pliable so as to be readily sheared, e.g., pierced. Aluminum foil of the mentioned thickness is suitable for this purpose. Also, if desired, and indeed preferably, the pellet may, as a safeguard and precaution, have a seal applied around the mechanical joint between the top wall 100 and the lip 108. This seal may be readily formed with the aid of aluminum foil having a thermoplastic coating. That is to say, the two faces of the foil which are in juxtaposition at the mechanical seal may be thus coated and may be heat-sealed together as is described in United States Letters Patent No. 2,778,739, for "Package for Beverage Infusion Material," dated January 22, 1957. In the event that a dairy product is to be contained in the pellet, I prefer that the same be incorporated in the manner shown in my aforesaid United States Letters Patent No. 2,968,560, i.e., that the ground coffee be located adjacent the top wall 100 and that the dehydrated dairy product (creaming agent) be located adjacent the bottom wall 102 and that these two products be separated by a porous membrane.

To facilitate the arrangement of the pellets 98 in separate stacks the pellet magazine 56 constitutes a side-by-side series of vertically elongated U-shaped channels 112 (FIGS. 4, 5 and 7) of the proper cross-section to nicely receive horizontally disposed pellets with very little front-to-back or side play, thereby guiding the pellets in the stack for vertical movement. The tops of the channels 112 are open for inserting pellets therein. The fronts of the channels could be closed; however in order to permit a maintenance man to quickly ascertain the number of pellets in any given channel and to permit facile loading, the fronts of the channels are left partially open (see FIGS. 4 and 7), the side edges of the fronts being restricted by vertical strips 114. The spaces between the vertical edges of the strips are smaller than the maximum horizontal dimensions of the pellets whereby the pellets can not be withdrawn forwardly from the channels 112 except as mentioned hereinafter. This stacking arrangement for the pellets has the further advantage that it enables an operator to insert a finger into a channel to straighten out an improperly oriented pellet as, for example, a pellet that has been inserted upside down or a pellet that has been turned and jammed in the stack.

Each of the channels 112 terminates at its lower end in a forwardly facing open horizontal slide constituted by a pair of angle irons 116 (FIGS. 4, 6, 7, 10 and 11) the front ends of which are unobstructed. Optionally adjacent angle irons may be interconnected to form an iron of T-shaped cross-section (FIGS. 4 and 7). The heights of the angle irons are slightly in excess of the height of a pellet 98. The bottoms of all the channels 112 are closed by a horizontal band 118 which is spaced from the horizontal legs of the angle irons 116 by a distance somewhat in excess of the height of a pellet 98 so that, when properly manipulated, the lowermost pellet in each stack may be pushed forwardly beneath the band so as to be discharged from its associated stack and channel.

The next to the lowermost pellet will be prevented from being discharged when the lowermost pellet is pushed out by abutment against the back surface of the band 118 and by the strips 114.

Preferably, I restrain discharge of the lowermost pellet so as to exercise control thereover by frictionally impeding forward motion thereof. This is accomplished by a set of leaf springs 120 (FIGS. 4, 7, 10 and 11) each having a vertical portion secured to the band 118 directly in front of each stack and having a forwardly extending toe 122 at the proper height to bear lightly against the top wall 100 of the pellet being discharged and which still is resting on the forwardly protruding pair of angle irons 116.

Attention is directed particularly to FIG. 5 wherein it will be seen that every pellet in each stack has its horizontal position nicely controlled so as to prevent unwanted shifting thereof. The flange 106 of each pellet is contacted at least, and preferably only, at three points which fix the horizontal position of the pellet. Two of these points contact the vertical edges of the strips 114 associated with each channel 112 and the third point could constitute the back wall of the channel; however I prefer to insert a vertical guide 124 in every channel, said guide being located adjacent the rear corner of the channel and having a projecting edge adapted to slidably bear on the flanges of the pellets in the stack.

The water heating station 58 (FIGS. 3 and 27) represents a particularly novel feature of my invention. As indicated earlier in this description, it has been the custom in conventional vending machines to maintain a substantial quantity of water, e.g., 5 to 10 gallons, at an elevated temperature, e.g., in the order of 200° F. or higher, since such a high temperature is preferred for the brewing of coffee and a large volume is maintained at this temperature in order for the machine to be able to furnish many cups of coffee in quick succession when there is a run on the machine, for instance, during lunch hour or a coffee break. However when such large quantities of water are kept at this high temperature there are several attendant disadvantages. One is that if the machine is used in a hard water area various salts such, for instance as calcium carbonate will be formed at the high temperature and will deposit on the internal surfaces of the heating tank from which they eventually must be removed. Another difficulty resulting from the maintenance of large bodies of water at high temperatures slightly below the boiling point is that the water becomes deaerated and this has a detrimental effect upon the taste of the coffee. Still another disadvantage is that where a large volume of water is maintained at high temperatures, if a defect occurs either in the relief valve or the thermostat, a high pressure will be generated and an explosion will take place, the magnitude of which is a function of the size of the storage tank. With a storage tank of several gallons capacity considerable damage heretofore has occurred.

I have avoided all of these difficulties with the water heating station 58 which I now will describe. Pursuant to my invention I provide two heating tanks one of these being a storage tank 126, sometimes referred to herein as a reserve or standby tank, which is of a small capacity, for instance, one half gallon, compared to previous heating tanks. The other is a heating tank 128 of considerably smaller capacity.

The arrangement about to be described is such that the water in the standby tank 126 is maintained at a temperature less than that at which the brewing (infusion) is to occur. A satisfactory temperature is at least below 180° F. and preferably below 160° F. as at temperatures above these water tends to deaerate more and more rapidly. I have found that particularly good results are obtained where the water in the storage tank is kept at 150° F. and even as low as 140° F. Maintaining the temperature higher than indicated tends to deaerate the water too quickly and to encourage liming, while keeping the standby temperature much lower than 140° F. tends to impose too great a burden on the second stage (topping) heating which subsequently must take place in the small heating tank where the water will be brought up to higher than 180° F., e.g., to 190° F., to 205° F. or even boiling.

It will be observed that the heater in the standby tank does not have to raise the water from tap temperature to brewing (infusion) temperature but simply has to raise the temperature of the water to about 140° F. to 150° F., i.e., the standby warm but not high temperature necessary for brewing. Due to this arrangement I am able to use a small reserve tank, e.g., one half gallon, that is much smaller than the customarily employed for reserve tanks, e.g., 5 to 10 gallons since, if the temperature in the reserve tank is lowered momentarily upon the introduction of cool tap water, the topping heater has excess reserve caloric power to raise the temperature of water to be dispensed to a high enough temperature for brewing.

It furthermore will be appreciated that with this arrangement only a small quantity of water is heated to high brewing temperature for what usually will be only a very short period of time and in this short period deaeration and liming will be negligible.

During standby operations when the temperature of the water in the reserve tank is kept at about 140° F. to 150° F., in any event not in excess of 180° F., the temperature of the water in the flash or topping heating tank 128 is in accordance with one preferred form of my invention likewise maintained at a standby temperature of about the same order, to wit, about 150° F. and in no event in excess of 180° F. To maintain the water in said tanks at the temperatures indicated, the storage tank includes a heating coil 130 (FIGS. 27 and 28) and the metering tank 128 includes a heating coil 132. The heating coils may be of any well known standard construction. For example, they may constitute "Calrod" units such as are made by the General Electric Co., these units constituting helical resistance wire located within a tubular metal sheath and insulated therefrom by powdered talc. The sheath may be finned to aid in heat transfer. The capacities of the two heating coils are suitably selected to maintain the temperatures indicated above.

The standby heating coil 130 is connected in series with a thermostat 134 (FIGS. 27 and 28) exposed to the temperature in the reserve tank and for optimum results will maintain the water therein at 140° F. to 150° F. with a through flow rate of three gallons every twelve minutes. At slower rates of water flow the thermostat will intermittently deactivate the heating coil 130 to maintain the temperature at about 140° F. to 150° F. The heater 132 which is used as a topping heater has a higher caloric capacity than the heater 130. The capacity of said heater is so selected that if the heater is activated as water starts to flow out of the flash heating tank the temperature of the water as it flows out of the tank, but not necessarily all of the water in the tank, at once will quickly be raised to approximately boiling temperature or slightly short thereof.

It should be understood that my invention is not limited to the specific construction of the topping heater for this may take various forms. It may, as indicated by a simple Calrod sheathed tubular heater or it may be a finned Calrod unit or it may be an electrolytic heating unit. All of these have been found to give excellent results; however I prefer a simple sheathed resistance type heating unit since it is easy to maintain, easy to replace and is not affected by variation of salt content in the water.

Various pipes and valves which will be described hereinafter in connection with the hydropneumatic circuit of FIG. 27 also form a part of the water heating station 58.

In an alternate form of my invention the thermostat in the smaller tank keeps the small quantity of water therein at a higher temperature than in the reserve tank, e.g., above 180° F., for example 195° F., and thus the water in this tank is held at a temperature sufficiently high for preparing hot potables without flash heating the same as it leaves the small tank.

The two heating tanks are suitably supported on a shelf 136 (FIG. 3) located within the shell 32 as with the aid of a platform 138.

The brewing station 60 is best described with reference to FIGS. 3 and 15-21. Said station includes a brewing ram 140 and a brewing anvil 142. These also may be referred to respectively as the movable brewing jaw 140 and the stationary brewing jaw 142.

The brewing ram 140 constitutes an upper brewing jaw 144 in the form of a thick metal disc provided with various passageways that will be described hereinafter. The brewing jaw is mounted at the lower end of a vertical spindle 146. Said spindle carries two pistons, to wit, a small diameter piston 148 and a large diameter piston 150. Both of these pistons preferably include peripheral sealing rings, such as O-rings. The two pistons ride in a single cylinder 152 having interconnected concentric portions of two different diameters, to wit, a lower small diameter portion 154 and an upper large diameter portion 156. The two portions are coaxial with the spindle 146. Said cylinder is arranged with its longitudinal axis vertical and is clamped in such position by a bracket 158, supported from the shelf 136. Thus the spindle is constrained for vertical movement under the play of fluid forces on the outer faces of the two pistons 148, 150. When equal unit fluid forces are applied to the outer faces of the two pistons the spindle will be driven down, but when a preponderant unit fluid force is applied to the outer face of the small diameter lower piston 148, the spindle will be driven up.

The spindle is so located with respect to the stationary brewing anvil 142 that the brewing jaw 144 can be moved by the spindle between an elevated (open) idle position (shown in FIG. 15) and a lower (closed) brewing position illustrated in FIG. 16. A vent opening 160 (FIG. 27) is disposed in the step 162 that is located at the line of demarcation between the two portions of the cylinder. This part of the cylinder thereby is exposed to the ambient atmosphere so that the two pistons have air on the inner faces and water on their outer faces.

Desirably, the uppermost position of the brewing jaw can be adjusted. This is accomplished by an abutment screw 164 threaded through the top wall of the cylinder and having its tip located to engage the center of the upper face of the large diameter piston 150.

A water connection 166 is located at the top of the upper large diameter portion 156 of the cylinder and another water connection 168 is located at the bottom of the lower small diameter portion 154 of the cylinder. These are the connections that are employed to supply water under pressure to the operative (outer) faces of the two pistons 148, 150.

The brewing jaw 144 includes a plenum chamber on its lower face, this being in the form of a downwardly facing annular groove 170 on said face which is concentric with the spindle 146. Water is led to said groove 170 through an internal passageway 172 that terminates at a water connection 174 at the side of the brewing jaw 144. Said water connection is secured to a flexible hose 176 whereby to permit the connection to be maintained as the brewing ram experiences vertical movement.

The brewing jaw also includes on its lower face a suitable arrangement for piercing openings in the frangible top wall 100 of the pellet 98 which, when the brewing ram descends, is located on the brewing anvil. Said piercing means comprises a flat horizontal ring 178 in face-to-face contact with the flat undersurface of the brewing jaw and concentric with the spindle 146. The ring is located radially outwardly of the annular groove 170. Both peripheral edges of the ring, i.e., the inner and outer edges, are downturned and notched, i.e., serrated, to form teeth (tines) 180 so that there will be one outer circular row of such teeth and one inner circular row. The teeth are angled, i.e., slightly inclined to the vertical. All the teeth may be inclined in the same direction, either inwardly or outwardly, or, as shown, the inner row may be inclined outwardly and the outer row inclined inwardly.

When the brewing jaw descends onto the flat top wall of the pellet the tips of the angled teeth (tines) will enter into and pierce said top wall and, due to their inclinations, will progressively shear away tongues 182 in the wall so as to leave small openings 184 therein which are not completely filled by the teeth 180. These openings are quite tiny, indeed they are so small as not to permit appreciable passage of coffee grounds or the like therethrough although they will permit entry of water through the same and into the pellet.

Near its periphery the undersurface of the brewing jaw 144 is formed with an annular channel 186 in which there is located a sealing O-ring 188, a portion of which, when the brewing ram is idle, extends below the flat horizontal bottom surface of the brewing jaw. The O-ring is so proportioned that it will engage the upper surface of the flange 106 of a pellet 98 seated on the brewing anvil. Furthermore the brewing jaw has a dependent peripheral skirt 190 with a chamfered lower internal surface 192 which is employed as a camming, i.e., guiding, surface in cooperation with the brewing anvil so as to insure centering of the brewing jaw when it is lowered into operative (brewing) position.

In the preferred form of my invention the brewing jaw includes a pressure and stripping pad 194 which is arranged to lead the brewing jaw in its downward movement and to engage and lightly resiliently press against a pellet 98 supported on the brewing anvil so that the same will be firmly held in place prior to and during the piercing of the openings 184 in the pellet by the angled teeth 180 and will be forced off the teeth after a brewing operation is completed.

Said pressure and stripping pad conveniently is of cruciform shape (see FIG. 21) with the tips of its four arms 196 registered with spaces between the teeth 180 on the ring 178. The arms are long enough to extend a substantial distance outwardly from the center of the pellet whereby to secure a substantial steadying and stripping effect.

The pressure and stripping pad is mounted for vertical movement with respect to the brewing jaw and is spring loaded in a downward direction. To this end the center of the pad is apertured to pass a screw 198 that is received in a tapped opening in a vertically reciprocable post 200 of non-circular, e.g., square, cross-section to which the pad is held by the head of the screw. The post is slidably mounted in a sleeve 202 having a vertical longitudinal through opening the contour of which matches the contour of the post. The upper end 204 of the post is enlarged to provide a head which by abutment with the upper end of the sleeve 202 defines the lowermost position of the pressure pad with respect to the brewing jaw. A vertical pin 206 is telescopically received in a central bore 208 in the post so as to steady the same. The post is biased downwardly by a helical compression spring 210 located in a vertical downwardly opening blind bore 212 in the spindle 146. Said spring encircles the pin 206, has its upper end pressed against a button 214 carried by the top of the pin 206 and its lower end seated against the enlarged upper end of the post 200.

The sleeve 202 is removably secured to the brewing jaw, as by threaded engagement with the tapped lower end of the blind bore 212. This arrangement permits the pressure pad and its mount to be quickly and easily removed for cleaning whenever it may be desirable. The toothed ring 178 is held in place by screws 216 that engage tapped apertures in the brewing jaw whereby said ring likewise can be dismounted for cleaning or replacement.

The brewing anvil 142 is located below and in vertical registry with the brewing jaw 144. Said anvil includes a cylindrical tubular side wall 218 which, in conjunction with a base wall 220, defines a cup shaped compartment 222 adapted to be closed by the brewing jaw when the latter is depressed. The diameter of the side wall 218 is slightly less than the inner diameter of the skirt 190 so that the brewing jaw, when lowered, will partially telescopically engage the brewing anvil.

The mouth of the cylindrical side wall 218 is formed with an inwardly stepped upwardly extending annular flange 224 that is in registry with the sealing O-ring 188. As has been noted heretofore, the O-ring 188 is in registry with the flange 106 of the flavoring-material-containing pellet 98 when the same is centrally seated on the brewing anvil. Thus, with a pellet so positioned, the flange 106 will have the sealing ring 188 directly above it and the flange 224 directly beneath it, as can be seen by inspection of FIG. 17.

It has been pointed out above that the brewing jaw is provided with angled piercing tines 180 which are adapted to form openings 184 in the top wall 100 of the pellet by a piercing curling action. A similar arrangement is provided for the brewing anvil 142. The piercing tines could, if desired, be formed in the same manner as those 180 of the brewing jaw, that is to say they could be fashioned by providing a horizontal flat ring with upwardly turned serrated flanges at its inner and outer peripheries. Nevertheless, I have illustrated a different structure for the brewing anvil which structure has a certain advantage over the flat ring type of piercing tines in that can be fabricated with the aid of existing types of flat band structures that can be purchased with angled teeth thereon, e.g., band saw blades.

Thus, the brewing anvil 142 is provided with angled piercing tines through the medium of flat sections of serrated bands (ribbons) 226 having straight (unserrated) lower edges and having upper edges which are serrated to form angled teeth (tines) 228. All of the teeth are inclined from the vertical, i.e., "set," the inclination being comparatively slight. Optionally the inclination of alternate teeth may be opposite from one another or, as shown, all of the teeth may be inclined in the same direction, to wit, radially inwardly. There are several such flat bands 226, e.g., three, and the same are held in any suitable manner, for example, in a heavy supporting spider 230. This spider contains several, e.g., three, arms 231 meeting at the center of the base of the brewing compartment. The radial lengths of the arms is such that the spider substantially bridges the base of the brewing compartment.

The arms 231 are formed with arcuate slots 232 that mutually define three concentric circles centered about the vertical axis of the spindle 146. The toothed bands 226 are set with their straight lower edges inserted and held in these slots whereby to form a nest of three upstanding serrated circular sleeves the teeth (tines) of which extend upwardly toward the brewing jaw 144 and also toward the bottom wall 102 of the flavoring pellet 98 which they are to pierce.

The upper surface of the base wall 220 of the brewing compartment is sloped toward a central drain opening 234 from which a discharge conduit 236 extends downwardly.

To support a pellet 98 on the brewing anvil 142 the machine 30 has a floating stripper seat 238 located above the nest of toothed circular bands 226. The stripper seat is in the form of a horizontal flat disc that is slotted in vertical registry with the teeth 228 so as to permit the angled teeth to pass through the seat without interference. The periphery of the disc is downwardly flanged and is in sliding engagement with the inner surface of the cylindrical side wall 218 of the brewing compartment whereby the disc is prevented from experiencing any noticeable amount of side play.

Said disc (floating seat) is biased upwardly to an elevated position with respect to the brewing jaw in which position the disc is at approximately the level of the top of the jaw as defined by the upper edge of the annular flange 224. The floating stripper seat is supported by a column 240 of non-circular cross-section, e.g., square, the upper end of which is connected, as by swedging, to the center of the seat. The column passes through and slidingly engages a central aperture 242 in the hub 244 of the spider 230. The floating stripper seat is biased upwardly by a helical spring 246 which encircles the column 240, has its upper end resting against the undersurface of the seat and its lower end engaging the top of the hub 244. The portion of the column extending below the spider is in registry with the drain opening 234 and is formed with radially outwardly extending shoulders 248 that are adapted to abut against the undersurface of the hub whereby to determine the uppermost position of the floating seat.

The floating stripper seat should be readily disengageable from the spider 230 for cleaning and to this end I bifurcate the lower end of the column, as by a deep slot 250 therein, said slot extending between the shoulders 248 so that if the twin lower ends of the post are squeezed towards one another the shoulders can be brought together sufficiently to enable them to be slid through the aperture 242 in the spider.

It now will be apparent that when the brewing jaw 144 descends, the pressure stripping pad 194 first will engage the upper surface of a pellet on the floating stripper platform. As the jaw continues to descent, the floating seat together with the pellet will be pushed down until the tips of the lower angled teeth 228 extend through the slots in the floating seat and rest against the bottom wall of the pellet. Further downward movement of the brewing jaw 144 will force the upper and lower teeth through the upper and lower walls of the pellet as illustrated in FIGS. 18 and 19 and at the same time will cause the O-ring 188 to press the flange 106 of the pellet against the upstanding flange 224 of the brewing anvil whereby at this time not only will the pellet have been perforated (pierced) at the top and bottom but it will be hermetically sealed in the compartment 222 ready for a brewing operation. When the brewing jaw lifts off the anvil the strippers 194, 238 will disengage the teeth 180, 228 from the exhausted pellets.

In FIGS. 23–26 I have illustrated another arrangement for providing piercing teeth which arrangement can be utilized in conjunction with either or both of the brewing anvil and the brewing jaw. This latter arrangement has the advantage of employing flat serrated bands like the bands 226 but does not have one of the disadvantages of the bands 226 which is that said bands 226 have their ends interconnected, as by welding or brazing, to form rings. The angled piercing teeth in FIGS. 23–26 simply use linear flat bands.

More particularly in FIGS. 23–26 I have illustrated a brewing anvil 142' having a brewing compartment 222' which is identical to the brewing jaw 142 and brewing compartment 222. For piercing teeth I have, instead of employing a spider with concentric serrated rings in the form of circular flat bands, utilized an eggcrate (crossed interlocked partitions) 252 consisting of two sets 254, 256 of flat bands 258. The bands of all the sets are straight (linear) and have unserrated lower edges and serrated upper edges, that is to say the upper edges are formed with teeth 260. The teeth are slightly inclined to the vertical and all the teeth of any given flat band may be inclined in the same direction or alternate teeth may be inclined in opposite directions.

The bands of the upper set 254 (when assembled as shown in FIG. 25) are formed with slots 262 extending upwardly from their lower edges and the bands of the lower set 256 are formed with slots 264 extending downwardly from their upper edges. All of the bands of the upper set are parallel to one another. All of the bands of the lower set are parallel to one another and are perpendicular to the bands of the upper set. Preferably the bands in each set are uniformly spaced apart. The bands of the two sets are crisscrossed and are interlocked by tight frictional fitting of the bands of each set into the slots of the crossed bands of the other set to form a rectangular grid or eggcrate as can be seen in FIG. 23. The interlocking is reinforced by crimping (not shown). The lengths of the various bands are so selected that the ends of the bands of the crossed partitions define a circle. If desired these ends may be received within an assembly collar 266 which said ends frictionally engage.

In their assembled relationship the bases of all the teeth preferably are in a common horizontal plane and the tips of the teeth are in another horizontal plane. The assembled bands and columns are adapted to rest upon the base 220' of the compartment as shown in FIG. 24 whereby to provide an eggcrate piercing tine matrix for the brewing anvil which is functionally equivalent to the ring type piercing matrix formed by the circular bands 226 and spider 230.

The brewing anvil 142' also includes a floating stripper seat 268 which is located in horizontal position over the mouth of the compartment 222'. The seat is adapted to be vertically reciprocated into the brewing compartment and is formed with slots 270 in registry with the piercing teeth 260. The seat is supported by a column 272 consisting of a resilient band of metal bent to form a base 274 from which there extend downwardly a pair of long parallel arms 276. These arms pass through the central rectangular opening in the eggcrate piercing tine matrix and are formed with outwardly extending shoulders 278 that are located to abut the lower surface of the eggcrate when the floating seat is in its uppermost position. The arms are sloped inwardly beneath the shoulders to form camming surfaces 280.

The floating seat 268 is biased upwardly by a group of, e.g., four, helical compression springs 282 the upper ends of which are received in shallow wells 284 in the under surface of the floating seat and the lower ends of which are held by clips 286. Each clip has an annular base on which the lower end of the associated spring is seated and is held by tabs integral with the base. Flat springy arms extend up from the base and are provided with struck out tiny tongues that engage the upper edges of a pair of adjacent bands 258. The spaces between the clip arms at said tongues exceeds the spacing between the bands so that the base of the clip is supported by the bands. The upper ends of the bands are as wide as the space between the transverse bands so that the clip is steadily supported. Moreover, the arms are flanged out near the base of the clip to enable them to be sprung under the lower edges of the bands 258. By virtue of the foregoing arrangement the clips (and springs) can be quickly and firmly secured to the matrix and easily removed therefrom for cleaning. The base 274 of the column is fastened, as by a rivet 288, to the floating stripper seat 268.

The brewing anvil is formed with a pendant shank 290 (see FIGS. 15 and 16) through which the drain opening 234 passes. This shank is located in a slot 292 fashioned in an arm 294 (see also FIG. 4) that constitutes a stationary part of the machine. The open end of the slot is removably closed by a plate 296 that is pivotally secured to the arm 294 by a bolt 298. When the bolt is loosened the plate 296 can be swung down and the shank 290 slipped out of the slot 292. To remount the brewing anvil the shank is reintroduced into the slot 292, the plate 296 is swung upwardly and the bolt 298 retightened. Optionally, for the purpose of maintaining angular orientation, the shank 290 may be formed with a transverse projection 300 (FIG. 4) adapted to be received in a notch 302 in the plate 296.

This dispensing station 62 (see FIG. 3) comprises a horizontal perforated dispensing platform 304 supported from the shelf 136 and located directly in back of the removal aperture 42 in the casing door 36. Said dispensing platform is adapted to have the bottom of a cup 80 situated thereon when a hot potable is being brewed and dispensed. Side wall shields 306 are disposed on the opposite sides of the dispensing platform so as to isolate the dispensing station from the interior of the casing. These shields are formed with vertical tracks, i.e., grooves, 308 near the front edges thereof in which there is received a transparent plane protective panel 310 having a handle 312 that can be manipulated through the removal aperture 42. Thereby the user is guarded against accidental contact with the hot potable during the filling of the cup and can readily raise the panel thereafter to withdraw a full cup.

Cups are led to the dispensing platform by an inclined chute 314 (FIGS. 2 and 3) the receiving end of which is disposed below the discharge terminal of the cup dispensing mechanism 50. This chute leads a cup, bottom downmost, from the cup dispensing mechanism to a vertical funnel 316 (FIGS. 2, 3, 15 and 16) directly above the dispensing platform 304. The lower edge of the funnel snugly engages the rim of a cup but is cut away in front as at 317 to an extent sufficient to pass the side walls of the cup when the cup is raised slightly and drawn forwardly (see FIG. 3).

A flavored hot potable is led to the cup from the brewing compartment through a dispensing tube and spout 318 (see FIGS. 3 and 15) that runs from the discharge conduit 236 to a point above the funnel 316. A waste tube 320 extends from the space below the perforated dispensing platform 304 to the waste container 54.

The pellet transfer mechanism 64 (FIGS. 4, 6, 7, 8, 9, 10, 11, 12, 12A, 13 and 14) constitutes an arrangement for controllably transporting one pellet 98 at a time from any selected one of the channels (stacks) 112 to the floating seat 238 (or 268) (the brewing station). The transfer mechanism must be so arranged as to transport pellets from any one of a variety of stacks to the single floating seat without any danger of sticking, jamming or turning the pellet and while maintaining the pellet topside uppermost. To this end I employ a pushing arrangement (FIGS. 4, 6, 7, 8, 9, 10 and 11) for ejecting the bottommost pellet in any selected channel, a slide arrangement (FIGS. 4 and 7) for converging (transversely shifting to a central location) pellets (one at a time) from any selected channel to a single site in back of and at a level higher than the floating seat, a drop arrangement (FIGS. 4, 7, 12, 12A and 13) for causing the pellet to fall to an intermediate station in back of and level with the floating seat, and a kicker arrangement (FIGS. 4, 7, 12, 13 and 14) for advancing the pellet from the drop (intermediate station) to the floating seat.

The pushing arrangement is best described with reference to FIGS. 4 and 6–11. It will be recalled that the bottom of each vertical channel 112 is defined by the spaced horizontal flanges of a pair of angle irons 116 between which there is a forwardly extending clear space. The lowermost pellet of each stack is seated on these horizontal flanges and bridges the space. The backs and fronts of the channels are open to permit an ejector (pusher) element to sweep therethrough.

There is one such ejector element 322 for each of the channels, all the ejector elements being rotatable about a common horizontal spindle 324 the ends of which are fixed to the sides 326 of a transversely elongated carriage 328. The sides of the carriage have secured thereto rigid dependent legs 330. The lower ends of the legs are tied together by a transverse jack shaft 332 (FIGS. 4, 7 and 9) the ends 334 of which are pivoted in bearings 335 (FIG. 9) that are carried by the casing 32.

Thus, if the jack shaft is oscillated, the carriage 328 will be rocked. When the carriage is at rest it will be in the rearmost position shown in FIG. 7 and in solid lines in FIGS. 10 and 11. An intermediate forwardly moving position of the carriage is shown in FIG. 4 and in dot and dash lines in FIGS. 10 and 11.

Each ejector (pusher) element 322 is roughly L-shaped (see FIGS. 10 and 11) and has the base of its long leg pivoted to the spindle 324. Suitable means, such as yokes 336 bearing against opposite sides of an end of this leg of each ejector element, prevent the ejecting elements from experiencing any movement axially of the spindle. Said long leg of each ejector element includes a downwardly extending follower 338 which rests on the sloped conical surface 340 of a head 342 formed on the outer end of the armature 344 of a selecting solenoid 346 (FIGS. 10, 11 and 28), there being one such solenoid, armature and head for each ejector (pusher) element.

As long as the solenoid 346 is idle a spring (not shown) forces the armature outwardly and permits the unstable ejector element to fall, under the influence of gravity, into its lowermost position illustrated in FIG. 10 with the follower resting on the cam surface 340. However when the solenoid is actuated it will draw in the armature which bearing against the follower 338 will swing the ejector element to an elevated position illustrated in solid lines in FIG. 11.

The short leg of the ejector (pusher) element extends upwardly and terminates in a T-shaped pusher head 348 (see particularly FIG. 6) which is horizontally elongated. The long leg of the ejector element is aligned with the clear space 350 between the horizontal flanges of the angle irons 116 and the length of the T-shaped pusher head 348 is such that it will fit between the side walls of the associated vertical channel 112.

If the carriage 328 is rocked from its rearmost toward its foremost position while any given pusher element 322 is in its lowermost position (with the solenoid 346 deactuated) the pusher element will sweep forwardly in the direction indicated by the arrow A (FIGS. 10 and 11) and in so doing will pass beneath the angle irons 116. However if any single pusher element has its solenoid 346 actuated, this element will be raised so that its pusher head 348 is above the level of the horizontal flanges of the angle irons 116 whereby when the carriage now is rocked forwardly the pusher element will sweep through the space 350 with the head 348 above the flanges and in so doing will push (eject) the lowermost pellet out of the stack and off the forward edges of the angle irons.

Since in the electric circuit which will be described hereinafter with reference to FIG. 28 the solenoids 346 only are energized for a short space of time (less than that required to eject a pellet from its stack) means desirably is included to lock a raised ejecting element 322 in its elevated position. Such means conveniently comprises a pair of leaf springs 352 (FIGS. 6, 10 and 11) attached to the backs of the channels 112 and which project slightly into the path of travel of the T-shaped pusher head as it is being raised upon action of the associated solenoid. The ends of the heads will brush past these springs and the springs will remain under the ends of the head so as to hold the heads up after the solenoid becomes deactivated.

When the carriage reaches its foremost position the T-shaped pusher head 348 will drop off the front edges of the angle irons 112 so that the pusher element will be restored to its idle position (the solenoid is deactuated a fraction of a second after its actuation) ready upon return of the carriage to sweep the T-shaped pusher head below the level of the angle irons 112.

Suitable means is included to oscillate the carriage so as to secure the foregoing action. Said means comprises a carriage motor 354 (FIGS. 7 and 28) supported from the shelf 136 and disposed with the motor shaft horizontal and parallel to the jack shaft 332. A cam plate 356 (see also FIGS. 8 and 9) having a cam node 358 is driven by the motor shaft. An eccentric pin 360 projects from the cam plate in a direction parallel to the motor shaft. Said pin rides in a slot 362 (FIG. 8) of a drive arm 364 the upper end of which is fast to the jack shaft 332. Hence as the motor turns through one revolution the jack shaft 332, and therefore the carriage 328, will be oscillated through one cycle.

The cam node 358 is arranged to actuate a switch 366 when the carriage is returning from its forward position. An additional switch 368 is provided which is arranged to be actuated by one of the carriage legs 330 when the carriage is in its rearmost position.

The slide arrangement is adapted to receive an ejected pellet from any one of the stacks and to bring it to a single site in back of the brewing anvil 142. In other words it must transversely shift a pellet ejected from any stack to a central location (behind the brewing station) in the machine. The amount of shifting required obviously will depend upon the location of the channel 112 in which the pellet 98 was disposed before ejection.

Although this transverse shifting could be performed by power it is speedier, simpler and more economical to permit the pellet to shift itself, and to this end the slide arrangement comprises a gravity chute 370 (FIGS. 4 and 7). The chute constitutes a broad flat plate the rear upper edge of which (FIGS. 10 and 11) is spaced a short distance in front of the front edges of the angle irons 116 and the lower front edge of which is centrally behind the brewing anvil 142, although at a higher level. The chute plate is tapered (wedge-shaped) from the broad rear edge to the narrow front edge and slopes forwardly and downwardly. The side edges of the chute plate have upstanding flanges 372 against which the side walls 104 of the pellet are adapted to slide and turn.

It will be apparent that a pellet 98 pushed out of any of the outermost channels will, upon dropping off the front edges of the angle irons and sliding down the flat wall of the gravity chute, quickly come into contact with one or the other of these squat side flanges 372 which tend to frictionally impede the speed of its descent and hold it to a rate of travel which will not be so rapid that control over the pellet will be lost. The flanges also transversely shift the pellets toward the desired central position. However pellets which are closer to the center of the gravity chute would if no preventative provision were made, be moving vary rapidly by the time they had had reached the discharge end of the chute and to prevent this from occuring I have placed a pair of downwardly diverging upstanding squat walls 374 at the upper center of the chute. Thereby the side wall of a pellet ejected from any one of the channels will, regardless of the position of the channel, strike either a flange 372 or a wall 374 before the pellet has travelled much more than halfway down the chute so that its speed of descent will be held to a reasonable range.

For the drop arrangement the discharge end 376 of the pellet delivery chute (see FIG. 12A) is formed to a semicircular configuration with a semi-circular funnel shaped mouth the entry end of which is larger than the diameter of the pellet flange 106 and the discharge end of which is barely larger than said diameter. Hence as the pellets reach this mouth their base walls 102 will slide and be guided centrally by the funnel shape until the flange is centered at the small diameter delivery end of the funnel. Thereupon the pellet will drop vertically. As the pellet drops it will tend to hold the inclination it had during its descent down the gravity chute. Therefore, the then forward segment of the bottom wall of the pellet will strike an intermediate horizontal station (platform) before the rear segment so that as the rear segment swings down there is a tendency to check forward motion of the pellet. Control of the pellets during drop also is maintained by the flanges 372 at the discharge end and, furthermore, by a downwardly depending lip 378 which surrounds the discharge end and forms the aforesaid funnel. It should be mentioned that in the absence of the lip 378 and in the absence of the restraint exercised by the flanges 372 the pellets would be travelling so rapidly at the discharge end that their movement could be irregular, i.e., bouncy, and they might not drop vertically to a fixed site at the discharge end.

The discharge end of the pellet delivery chute is immediately above a kicker plate platform (intermediate station) 380 that is directly behind and at the same horizontal level as the floating seat 238 (or 268).

The kicker arrangement moves the pellet from the kicker plate (intermediate) platform to the brewing anvil. Said arrangement includes a kicker motor 382 (FIGS. 4, 7 and 28) disposed behind the kicker plate platform and arranged with its shaft vertical. Mounted on the shaft is a kicker cam plate 384 having a cam node 386 and a drive pin 388. The cam node is adapted to actuate a kicker switch 390. The drive pin 388 pivotally engages the rear end of a kicker link 392 the forward end of which pivotally engages the rear end of a kicker bar 394 (FIGS. 4, 7, 12, 13 and 14). The kicker bar rides in a front-to-back groove 396 disposed centrally in the kicker plate platform 380. The forward end of the kicker bar is raised above the level of the platform 380 and constitutes a forwardly concave kicker 398.

In the idle position of the kicker bar 394 the kicker is retracted (see FIGS. 12 and 13) slightly behind the position a pellet 98 will occupy on the platform 380 when it drops through the discharge end of the pellet delivery chute. When thereafter the kicker motor is actuated and turns the kicker cam plate 394 through one revolution the stroke of the kicker is exactly proper to advance the pellet from the platform 380 onto and centralized upon the brewing anvil 142 pushing ahead of it onto the discharge chute 399 (FIGS. 15 and 16) the exhausted pellet left on the floating seat from the previous brewing operation.

It will be observed that a switch 400, hereinafter referred to as the "extraction" switch, has its actuating element 402 (FIGS. 4, 7, 12, 13 and 14) located to protrude through a slot 404 (FIG. 14) in the kicker platform 380 in such position that when a pellet drops off the gravity chute and rests on the kicker plate platform it will depress the element 402 and thereby actuate the switch 400. The kicker 398 is formed with a notch 406 that will clear the actuating element 402 when the latter is in its elevated position. Therefore the only way in which the extraction switch 400 can be actuated is by the presence of a pellet in its dropped position on the kicker plate platform.

For a reason which soon will be apparent I provide an upper brewing jaw switch 408 (FIG. 3) and a lower brewing jaw switch 410 having actuating plates 412, 414, respectively, located to be engaged by a pin 416 secured to the brewing jaw 144. The upper plate is contacted and the upper switch actuated when the brewing jaw is in its uppermost position and the lower plate is contacted and the lower switch actuated when the brewing jaw is in its lowermost position.

The hydropneumatic circuit 418 for my vending machine is schematically indicated in FIG. 27. Certain elements thereof already have been described and the rest will now be detailed. Tap water enters the circuit at an inlet pipe 420. Optionally a water pump 422 (FIG. 28) may be connected in the inlet pipe in the event that the local water pressure is not sufficiently high and it must be boosted. The inlet pipe runs to a T-fitting 424 and from there water branches to a pipe 426 and another pipe 428. The pipe 426 terminates at the water connection 168 to the lower small diameter portion 154 of the cylinder 152. The pipe 428 runs to the inlet side of a valve I of an electrically actuated type being controlled for example by a solenoid 430 (see also FIG. 28). The outlet side of the valve I is connected by a pipe 432 to a T-fitting 434. A pipe 436 branches from the T-fitting and runs to the water connection 166 at the upper large diameter portion 156 of the cylinder 152.

The other branch of the T-fitting 434 is connected by a pipe 438 to one side of a valve II controlled by a solenoid 440 (see also FIG. 28). Both valves I and II, as well as two other water valves soon to be described, are normally closed. That is to say, when the control solenoids thereof are deenergized the valves are biased, as by a spring, to closed positions. Actuation of the solenoid opens the associated valve. The other side of the valve II is connected by a pipe 442 to the water reserve tank 126. This reserve tank is, during normal operation of my machine, kept full of water at a moderately elevated standby temperature, e.g., 140° F. to 160° F. as noted herebefore.

Heated water leaves the reserve tank through a pipe 444 and passes through a check valve 446 which only permits water to flow out of the reserve tank. From the check valve water flows through a pipe 448 to a T-fitting 450. One branch leaving the T-fitting 450 through a pipe 452 is connected to one side of a normally closed valve III controlled by a solenoid 454 (see also FIG. 28). The other side of the valve III is connected by a pipe 456 to the flexible hose 176 that supplies heated water to the brewing jaw 144. The other branch of the T-fitting 450 is connected by a pipe 458 to the bottom of the topping heating small metering tank 128.

Connected to the top of the tank 128 is a cross fitting 460 having three branches. A first branch is connected by a pipe 462 to one side of a check valve 464 which only permits flow of fluid toward the tank 128. The other side of the check valve is connected by a pipe 466 to an air pump 468 (see also FIG. 28). A second branch of the cross-fitting 460 is connected through a riser 470 to a pipe 472 that runs to one side of a relief valve 474. The relief valve only permits flow of water in one direction, to wit, away from the tank 128 and this valve is loaded, as by a spring (not shown), so as to permit outward flow of water only upon build up of an excess of pressure. The valve is set to permit through flow of water at slightly above the water pressure of the system. For example, if local pressure is 60 p.s.i. or the pressure furnished by the pump 422 is 60 p.s.i. the relief valve 474 will open a few pounds above this, e.g., 80 p.s.i. The other side of the relief valve 474 is connected by a pipe 476 through a T-fitting 478 to a pipe 480 which runs to the waste container 54. The third branch of the cross-fitting 460 is connected by a pipe 482 to one side of a valve IV controlled by a solenoid 484 (see also FIG. 28). The other side of the valve IV is connected by a pipe 486 to the T-fitting 478 and thence through the pipe 480 to the waste container 54.

The operation of the machine 30 involves two cycles one of which is hydropneumatic and the other of which is electrical. To facilitate the understanding of the machine these two cycles will be described separately.

The operation of the hydropneumatic cycle will be described first since this represents the basic physical cycle of the machine. The operation of the electrical cycle simply controls this physical cycle of the machine in an automatic fashion with all operations properly timed and synchronized.

Referring then to FIG. 27, the machine will be considered first to be standing by after a hot potable has been brewed. At this time the brewing jaw 144 is in its elevated position. The solenoid 430 of valve I is deenergized so that the valve I is closed. The solenoid 440 of valve II is energized so that this valve II is open. The solenoid 454 of valve III is deenergized so that valve III is closed and the solenoid 484 of valve IV is energized so that this last valve IV is open. Water is present in the feed pipe 420. Tap pressure water is present at the same pressure in pipe 426 and in the lower smaller diameter portion 154. Water also is present from the last hydropneumatic cycle in the upper large diameter portion 156 above the piston 150 (the space between the pistons 148, 150 is air-filled). Water is present in the pipe 428 and from the last hydropneumatic cycle in the pipes 432, 436, 438 and 442. The reserve tank 126 is full of water (initially introduced when the machine was set up) maintained at a temperature of 140° F. to 150° F. (preferably not exceeding 160° F. and in no event exceeding 180° F.). Water is present in the pipes 444, 448, 452 and 458. The small heating tank 128 is full of water and water also may be present in the pipe 482. The riser 470 and pipe 472 will have a mixture of air and water vapor. The pipes 476, 480 and 486 will be full of air. The pipe 466 also will be full of air. The pipe 462 will be filled with air and water vapor and possibly some water.

It will be observed that because the pipe 480 is open to the atmosphere and because the valve IV is open, the pressure of the water in the small heating tank 128, when the machine is standing by, and thereby through the pipes 458, 448 and 444 the pressure in the reserve tank 126 as well, will be approximately atmospheric. Hence, through the pipes 442, 438 and 436 the water above the large diameter piston 150 likewise will be substantially at atmospheric pressure. Thereby the brewing jaw 144 will be maintained in its uppermost position because the total pressure on the lower face of the small diameter piston 148 will exceed the total pressure on the upper face of the large diameter piston 150.

The hydropneumatic cycle is initiated after a pellet has been selected, was ejected from its stack in the magazine, has descended down the pellet delivery chute and is resting on the kicker plate platform 380 so as to depress the actuating element 402 of the switch 400. As soon as this happens the valves II and IV (open in standby condition) are closed and concurrently the valve I (closed in standby condition) is opened. The valve III remains closed as it was in standby condition.

When the valve II closes the large diameter portion 156 of the cylinder 152 is cut off from atmospheric pressure and when the valve I concurrently opens tap pressure (optionally supplemented by a water pump) is applied to the upper (outer) face of the piston 150, the same pressure concomitantly being applied to the lower (outer) face of the small diameter piston 148. Since these two pistons are on a common shaft the total downward pressure will exceed the total upward pressure and the brewing jaw will be hydraulically lowered. This will tend to compress air between the pistons 148, 150 but this is driven out of the vent opening 160. The water present beneath the lower face of the piston 148 will be driven back through pipe 426 into the water main or source of water supply.

Closing the previously open valve IV isolates the small heating tank from the atmosphere (except for the relief valve 474 which will remain closed except for emergencies) for transfer of water from this tank into the brewing jaw 144; however because the valve III still is closed no transfer yet can be effected and of course this would be premature since the jaw 144 still has not been lowered. While the foregoing is taking place, i.e., while the jaw 144 is being lowered, in a preferred form of my invention the topping heater 132 is energized so as to start heating up the water in the flask tank to the higher temperature desirable for brewing.

In another form of my invention the topping heater maintains the water in the small tank 128 at a temperature in excess of 180° F., e.g., 195° F., while the machine is standing by.

When the brewing jaw 144 reaches its lowermost position and thereby has caused the tines to pierce the upper and lower faces of the pellet in the brewing compartment the valve III is opened and the air pump 468 is energized. Since the valve IV is closed, and since the valve 474 is a relief valve and thereby also is closed, air under pressure accumulates at the top of the small heating tank 128 and forces the heated water through the pipe 458. As it leaves, the water flows over the topping heater 132 to insure that this water is piping hot. The highly heated water cannot flow back into the reserve tank 126 because of the check valve 446; however it does flow through the now open valve III and pipe 456 into the brewing jaw 144 and the annular groove 170. From there the water flows through the perforated pellet in which the hot water brews the hot potable with the aid of the flavor material enclosed therein.

The now brewed potable flows out from the compartment 222 into the drain opening 234 and through the dispensing spout 318 into a cup situated on the dispensing platform 304.

Attention is directed to the fact that the heated liquid is forced through the pellet under air pressure. This is an elastic, i.e., yielding, pressure as distinguished from the inelastic pressure of a liquid, so that when the water first strikes the pulverulent flavoring material in the pellet the water will not force itself immediately through the pellet with a steep pressure front but, by permitting the air pressure to build up, will only comparatively gradually wet down the granules in the pellet. This wetting effect enhances the flavor that I am able to obtain in the hot potable and will tend to prevent driving of particles of flavoring materials through the discharge openings in the bottom of the pellet and thence into the cup on the dispensing platform. Moreover this gradual application of pressure, i.e., build up of pressure, will prevent the creation of shock forces in the various parts of the machine so that there will be no vibrations or knocks.

The air pump 468 will continue to operate for a predetermined time which is sufficient to enable the air to force all of the now highly heated water out of the flash tank 128 and through the pellet. Moreover the air pump thereafter will continue to operate so as to wholly flush out all of the water in the pipes 458 and 456 and will further flush out all of the beverage in the dispensing section downstream of the pellet. This air which is heated by the coil 132 thereby cleans or flushes the potable containing portion of the machine each cycle and tends to prevent accumulation of sediment or particles which would tend to impair the flavor of subsequently dispensed hot potables. Such air flushing, as it were, furthermore assists in removing residues of previously dispensed hot potable which might vary the flavor of the next potable to be dispensed.

The amount of water in the small heating tank and pipe 458, 452 is substantially equal to the amount (an individual portion) of hot potable to be dispensed (less the amount of liquid which will be retained in an exhausted, i.e., extracted or leached out, pellet). Thus the small heating tank in effect serves as a metering compartment since the bulk of the water to be dispensed each cycle is contained therein; and therefore each time that this tank is emptied by air under pressure it will cause the right amount of water to pass through the brewing portion of the system and into the cup on the dispensing platform.

After a predetermined time which suffices for the air under pressure to discharge all of the liquid in the metering tank 128 and to clear out the dispensing section, the valves I and III are closed, the air pump 468 is deactivated and the valves II and IV are opened.

Closing the valve III cuts off the small heating tank from the brewing jaw and opening the valve IV reconnects this tank to the atmosphere. Opening the valve II reconnects the upper portion 156 of the cylinder 152 to the reserve tank and to the atmosphere and closing of the valve I disconnects this upper portion of the cylinder from the source of water under pressure. Thereby an upward force again will be applied to the spindle 146 causing the jaw 144 to be lifted.

As the piston 150 is raised it will force water through pipes 436, 438, valve II and pipe 442 into the reserve tank 426. Inasmuch as this tank is full with mildly (140° F. to 160° F.) heated water an equal amount of water will be forced out of the reserve tank through the pipes 444, 448 and 458 into the small heating tank 128. Closure of the valve III prevents this water from entering the brewing jaw. The air in the flash tank 128 is driven out ahead of the entering water through pipe 482, valve IV and pipes 486, 480. The length of the upward stroke of the spindle 146 and the area of the piston 150 are so adjusted that the upward movement of the spindle 146 will substantially fill the small tank 128. This can be adjusted by means of the abutment screw 164. If too much water should be admitted it will flow out to the waste container 54 through the pipes 482, 486 and 480.

As indicated above, the control of the operation of the machine 30 is electrical and the same has an automatic cycle which is initiated by the closure of the coin actuated switch contacts 72. In describing the operation of the electric cycle I will at the same time refer to various electrical components not heretofore described which are included within the relay and timer assembly 52 as well as various wires the physical locations of which have not been shown in order to avoid confusion.

Power, i.e., A.C. power, is supplied from a source 488, e.g., a wall outlet receptacle, through a pair of leads 490, 492, a double pole single throw master switch 494 and fuses 496 to a pair of main buses 498, 500.

Closure of the normally open contacts 72 of the coin actuated momentary switch 48 completes a circuit from bus 498 through a lead 502, said switch contacts 72, an anti jackpot relay coil 504 (each relay and its associated coil will be denoted by the same reference numeral), a lead 506, a lead 508, the normally open pair of switch contacts 510 and a lead 512 to the bus 500. The anti jackpot relay 504 has three sets of contacts, to wit, a pair of normally open contacts 516 in the make circuit for a vend relay 518, a pair of normally closed contacts 556 in the energizing circuit for the selecting solenoids 346 and a latched relay 560, and a pair of normally closed contacts 628 in the make circuit for the cup dispensing motor 82.

The normally open switch contacts 510 are the contacts of the switch 92 which is controlled by the disc cam 86 on the cam shaft 84 of the cup dispensing motor 82. This cam has a circular periphery except for a small indentation 514 which is so positioned as to be almost 360° away from the actuating element of the switch 92 when the cup dispensing motor is idle. Thereby the cam 86 will maintain the contacts 510 closed when the machine is standing by and only will permit the contacts to open momentarily near (a few degrees away from) the end of a complete cycle of the cup dispensing unit. Accordingly when a coin of the proper denomination, or coins totaling the proper denomination, are inserted in the slot 70 and the switch contacts 72 thereby are momentarily closed the anti jackpot relay coil 504 will be momentarily energized.

The normally open pair of switch contacts 516 of the anti jackpot relay are connected to make the circuit for the coil 518 of the vend relay which has four sets of contacts, to wit, a pair of normally open contacts 532 in the hold circuit for the vend relay, a pair of normally open contacts 552 in the energizing circuit for the selecting solenoids 346 and the latched relay 560, a pair of normally open contacts 624 in the make circuit for the cup dispensing motor 82, and a pair of normally closed contacts 634 in the hold circuit for the cup dispensing motor 82 and the make circuit for the water pump 382. Said make circuit for the vend relay coil 518 runs from the bus 498 through a lead 520, a normally closed pair of switch contacts 522 of an extraction relay which is controlled by a coil 524 of said extraction relay, a lead 526, the now closed contacts 516 of the anti jackpot relay 504, a lead 528, the coil 518 of the vend relay, a lead 530, the lead 508, the closed pair of switch contacts 510 and the lead 512 to the bus 500. Thus immediately following actuation of the anti jackpot relay the vend relay will be actuated. The pair of normally open holding contacts 532 of the vend relay 518 is connected by leads 534, 536 to shunt the pair of switch contacts 516. Thereby when the momentarily closed switch 72 opens and opens the make circuit for the vend relay coil 518 said coil will be held energized through the hold contacts 532. The extraction relay 524 mentioned above has four sets of contacts. These are: the pair of normally closed contacts 522 in the make circuit for the vend relay 518, a pair of normally open contacts 708 in a hold circuit for the extraction relay 524 and a water pump relay 720, a pair of normally open contacts 740 in the energizing circuit for a timer 692, and a pair of normally open contacts 780 in a hold circuit for the topping heater 132.

For the purpose of checking operation of the machine I provide a normally open momentary switch 538 located inside the casing 32 and adapted to be manually operated when desired. This switch connects the bus 498 through leads 540, 542 to the vend relay coil 518 thereby permitting bypassing of the switch contacts 516, 522 and 532 for checking purposes.

As thus far described dropping of a coin simply has energized the coil for the vend relay. This readies the machine for selection of a pellet from any one of the stacks of the magazine 56. Such selection is performed when a patron depresses a button head 66 and thereby closes the associated normally open pair of switch contacts 68 whereby to energize the corresponding selecting solenoid 346. The energizing circuit for said solenoids runs from the bus 498 through lead 544, the closed pair of selected switch contacts 68, an associated lead 546, the selected solenoid 346 an associated lead 548, a common lead 550, the normally open but now closed pair of contacts 552 of the vend relay 518, a lead 554, the normally closed pair of contacts 556 of the anti jackpot relay 504 which contacts now are closed because the coil for this relay deenergized immediately following the momentary closure and subsequent opening of the switch contacts 72, a lead 558, an energizing coil of the latched relay 560, a lead 562, a pair of normally closed contacts 564 of said latched relay, a lead 566, a pair of normally closed contacts 568 of the carriage stop switch 368 (FIG. 7) and a lead 570 to the bus 500. It should be mentioned at this time that the switch 368 is of the single pole double throw type and, therefore, has another contact 572 which is open when the pair of contacts 568 are closed and is closed to the lead 570 when the pair of contacts 568 are opened. It also is to be noted that the latched relay has a pair of normally open contacts 574 in the energizing circuit for a carriage relay 576.

Attention also is drawn to the fact that the latched relay 560 is mechanically latched upon its energization so that when the coil of the relay 560 is deenergized the normally closed contacts 564 thereof which were opened will be held open until the relay 560 is unlatched by mechanical release of the latch. The release, as soon will be seen, is controlled by the coil of a release relay.

The latched relay operated by the coil 560 operates slower than the selecting solenoids 346, approximately 10 milliseconds slower. Accordingly, actuation of a selecting solenoid 346 will almost immediately be followed by deactuation thereof. In the interim, i.e., during the time that a selecting solenoid 346 is energized, it will elevate the T-shaped pusher head 348 to its operative position above the level of the angle irons 116 where the head will be held by the detent leaf springs 352 so that although the armature 344 of the solenoid 346 is pulled in only momentarily and then released and restored to idle position, the action will suffice to ready and hold the selected pusher 348 for operation. This arrangement whereby any selecting solenoid only is momentarily energized and then the energizing circuit is locked out prevents rapid sequential operation of two selecting buttons. Concurrent operation of two buttons is prevented by so proportioning the solenoids 346 that when two of them simultaneously are connected across the buses 498, 500 and in series with the relay 560 neither solenoid can draw sufficient power to elevate its head 348.

To recapitulate, pressing a selected button 46 will lift the associated pusher 348 to where it is ready to eject the lowermost pellet in the associated stack in the magazine 56.

Energization of the latched relay 560 closes the normally open pair of latched relay contacts 574 which are in the energizing circuit for the coil 576 of the carriage relay. This completes the energizing circuit for said carriage relay from the bus 498 through a lead 578, coil 576, a lead 580, the now closed contacts 574 and a lead 582 to the bus 500. It will be observed that the carriage relay will remain energized after the latched relay coil 560 became deenergized, inasmuch as the latched relay is mechanically held in actuated condition once it has been energized and until it is released by withdrawal of its latch.

The carriage relay 576 has a normally open pair of contacts 584 in the make circuit for the carriage motor 354. Said make circuit for the carriage motor runs from the bus 498 through a lead 586, the motor 354, a lead 588, the pair of normally open but now closed contacts 584 of the carriage relay 576 and a lead 590 to the bus 500 whereby after a selector button 46 has been pushed, following deposit of a coin in the proper denomination, first the pusher head 348 will be raised and then the carriage 328 will be rocked forwardly to force onto the gravity chute 370 the lowermost pellet in the selected stack of the magazine 112.

As soon as the carriage leaves its rearmost position (shown in FIG. 7) the switch 368 operates to close the blade thereof against the contact 572 thereby completing a holding circuit for the carriage motor 354. The holding circuit is from bus 498 through the lead 586, the carriage motor 354, the lead 588, a lead 592, the contact 572, the blade of the carriage rear switch 368 and the lead 570 to the bus 500. This hold circuit parallels the branch of the carriage motor make circuit including the pair of normally open contacts 584 of the carriage relay. Hence, during the entire forward movement of the carriage, as soon as it has left its rearmost position, parallel circuits furnish the power for the carriage motor.

Shortly after the carriage reaches its foremost position and has commenced its retrograde movement, the node 358 on the cam plate 356 (FIG. 7) will contact the actuating element of the front switch 366 which has a normally open pair of contacts 594 in a series with a coil 596 of a latch release relay, i.e., a relay which resets the latched relay 560 by withdrawing the latch or bolt that holds this relay in actuated position after the coil thereof has been deenergized. The energizing circuit for the latch release relay 596 runs from the bus 498 through a lead 598, the coil 596, a lead 600, the now closed contacts 594 and a lead 602 to the bus 500. Accordingly some time after the carriage reaches its forward position and starts to return the latched relay 576 will be reset, i.e., moved to idle position in which the normally closed contacts 564 thereof reclose and in which the normally open contacts 574 thereof open. Opening the contacts 574 deenergizes the coil of the carriage relay 576 causing the normally open contacts 584 controlled thereby to reopen whereby to cancel (open) the make circuit for the carriage motor 354. This leaves in operable condition only the hold circuit (through the contact 572 of the carriage rear switch 368) for the carriage motor, thus preparing the carriage motor for stopping at a later point in the cycle when the switch 368 is energized upon depression of the actuating element thereof by a carriage leg 330 when the carriage returns to its rearmost position.

As the carriage reaches its forward position a pellet 98 is propelled onto the gravity chute 370 and will slide down the chute to the discharge end 376 through which it will drop onto the kicker plate platform 380 to depress the actuating element 402 of the extraction switch 400 (FIGS. 4, 7 and 12–14). Depression of said switch automatically brings into play the heating, brewing and dispensing cycle.

The extraction switch 400 has a pair of normally open contacts 604 in the make circuit for the cup dispensing motor 82. This make circuit runs from the bus 498 through a lead 606, the now closed pair of normally open contacts 604, a lead 608, a contact 610 of the single pole double throw upper brewing jaw switch 408 (FIG. 3) which switch is controlled through the pin 416 by the position of the brewing jaw 144. At the beginning of a cycle the jaw is in its uppermost position and closes the blades 612 of the switch 408 against the contact 610 and holds it away from the contact 614 toward which latter contact the blade 612 is biased. The make circuit for the cup dispensing motor 82 continues from the contact 610 through the blade 612, a lead 616, a lead 618, the cup dispensing motor 82, a lead 622, and the normally open pair of contacts 625 of the vend relay 518. At this time the vend relay 518 still is energized because the cup dispensing motor 82 has not yet open the switch contacts 510 in the hold circuit for said relay and the extraction relay 524 has not yet been energized to open the contacts 522 in said hold circuit. The make circuit for the cup dispensing motor 82 continues from the contacts 624 through a lead 626, the normally closed pair of contacts 628 of the anti jackpot relay 504 which at this time is deenergized since the coin actuated momentary switch 72 is open, and a lead 630 to the bus 500.

Therefore as soon as the piar of contacts 604 of the extraction switch 400 close the cup dispensing motor will start to turn and will discharge a cup to the inclined chute 314 from which it will descend first to the funnel 316 and then onto the dispensing platform 304. Very shortly after the cup dispensing motor starts the contacts 522 will be opened by energization of the extraction relay 524 thereby cancelling the hold circuit for and deenergizing the vend relay coil 518. This allows the pair of contacts 624 to reopen and thus cancel the make circuit for the cup dispensing motor 82. However the cup dispensing motor will continue to operate through a hold circuit one section of which shunts the branch of the make circuit including the normally open contacts 604 of the extraction switch 400 and the blade 612 of the upper brewing jaw switch 408 and another section of which shunts the branch of the make circuit including the contacts 624 and 628.

The hold circuit for said cup dispensing motor runs from the bus 498 through a lead 632 and the pair of normally closed contacts 634 of the vend relay 518. These contacts are open when the cup dispensing motor make circuit is initially closed because at such time the vend relay still is energized. However very shortly after the cup dispensing motor starts and the normally closed contacts 522 of the extraction relay open to cancel the hold circuit for the vend relay, this hold portion of the circuit for the cup dispensing motor will be completed. Indeed it will be completed before the contacts 604 are opened by pushing of the pellet off the actuating element 402 of the extraction switch. The hold circuit for the cup dispensing motor continues from the now closed pair of contacts 634 through a lead 636, the lead 618, the cup dispensing motor 82, a lead 638, the normally open pair of contacts 640 and a lead 642 to the bus 500. The pair of contacts 640 are the contacts of the momentary switch 94 (FIG. 2A) which is actuated by the cam 88 of the cup dispensing motor. Said cam has a small indentation 644 so angularly located that when the cup dispensing motor reaches the end of its cycle the indentation permits the contacts 640 to be opened. But very shortly after the cam shaft 84 starts to turn upon energization of the cup dispensing motor the cam 88 will close the contacts 640 and will hold them closed until the cup dispensing motor shaft has completed a single cycle of the cup dispensing mechanism. Thereupon the contacts 640 will be reopened and since the make circuit for the cup motor previously has been opened, because of previous deenergization of the vend relay (by opening of the contacts 510 and 522), the cup dispensing motor will stop after a single cycle of operation. In other words, by transferring energization of a cup dispensing motor from the make circuit to the hold circuit the cup dispensing motor is prepared for deenergization at the termination of its cycle of operations.

It will be apparent that while the cup dispensing motor is causing a cup to be discharged in the dispensing platform 304 it is desirable to have the fresh pellet advanced from its drop position on the kicker plate platform to the floating seat 238 (or 268) at the brewing station (this operation also displaces the previously exhausted pellet at the brewing station). For this purpose it is necessary to energize the kicker motor 382. The kicker motor likewise has a make circuit and a hold circuit. A portion of said make circuit includes a branch of the make circuit and a branch of the hold circuit for the cup dispensing motor 82. More particularly, the make circuit for the kicker motor 382 runs from the bus 498 through the lead 606, the normally open pair of contacts 604 that are closed while the pellet is on the actuating element 402, the lead 608, the contact 610, the blade 612 which engages the contact 610 so long as the brewing jaw is in its uppermost position, the lead 616, the lead 618, a lead 646, and the normally open pair of contacts 648 of the momentary switch 96 (FIG. 2A) which is controlled by the disc cam 90 on the cam shaft 84 of the cup dispensing motor 82. The cam 86 has a small indentation 650 which when the cup dispensing motor is idle is aligned with the actuating element for the switch 96 thus permitting the contacts 648 to assume their normally open position. But very shortly after the cup dispensing motor starts, the contacts 648 are closed in the make circuit for the kicker motor 382. Said make circuit continues from the now closed contacts 648 through a lead 652 to a contact 654 of the single pole double throw kicker switch 390 (FIG. 7) having a blade 656 that is held in engagement with the contact 654 by the cam node 386 of the kicker cam plate. Said blade is biased away from the contact 654. The blade 656 is connected by a lead 658 to the kicker motor 382 which in turn is connected by a lead 660 to the bus 500. Hence very shortly after the cup dispensing motor is energized the kicker motor will start to turn.

As soon as the kicker 398 moves the pellet 98 off the extractor switch actuating element 402 the branch of the make circuit for the cup dispensing motor and the kicker motor, which branch includes the contacts 604, will open but before this occurs the parallel branch of the circuit for said motors, including the normally closed contacts 634 of the vend relay, will have been closed (due to the opening in the vend relay circuit of the normally closed contacts 522 of the extraction relay 524 which will have been energized as hereinafter described) whereby the kicker motor continues to operate.

Moreover as soon as the kicker motor turns through a few degrees its cam plate 384 will turn enough so that the cam node 386 will ride off the actuating element of the kicker switch 390 (FIG. 7). This will allow the blade 656 to be biased into engagement with the other contact 662 of the kicker switch 390 whereby to complete a hold circuit for the kicker motor. Said hold circuit runs from the bus 498 through a lead 664, the contact 662, the blade 656, the lead 658, the kicker motor 382 and the lead 660 to the bus 500. It will be apparent that as soon as the kicker motor has completed one revolution of the kicker cam plate 384, during which time the kicker 398 will have moved from retracted to advanced position and back again to retracted position, the cam node 386 will reengage the actuating element for the kicker switch 390 to open the hold circuit for the kicker motor. Before this has occurred the cup dispensing motor will have completed the cycle of operations for the cup dispensing mechanism which latter is more rapid than the kicker cycle so that the pair of contacts 648 will have been opened and the kicker motor will come to rest.

The electric circuit of my machine 30 is so devised that if a stack of pellets 98 in the magazine 112 should be exhausted and the push button 46 for said stack should be depressed, a suitable indication will be given to the purchaser and he will be permitted to depress another button corresponding to a different stack of pellets. It will be observed that the potable dispensing cycle essentially starts with the actuation of the cup dispensing motor for the purpose of dropping a cup onto the dispensing platform 304 and energizing the kicker motor. But the cup dispensing motor cannot start if the vend relay is actuated and if no pellet depresses the actuating element 402 so as to close this contact 604 after a coin is deposited. Moreover the vend relay will remain actuated unless the cup dispensing motor starts or the extraction relay 524 is actuated. Hence if no pellet drops onto the kicker platform the cup dispensing motor will remain idle. However the carriage motor 354 is energized when a button is depressed causing sequential energization of the latched relay 560 and the carriage relay 576. Accordingly, if the carriage oscillates through one cycle of operations and is stopped at the end of said cycle by operation of the rear carriage switch 368 (FIG. 7) in forcing the blade 568 off the contact 572 and back to the contact 568, the circuit for the solenoids 346 is reestablished since the reset relay coil 596 has been energized, the latch relay contacts 556 have been reclosed and the vend relay contacts 552 will have remained closed since the vend relay has not been deactuated. Therefore a button for another stack of pellets in the magazine can be depressed to start a fresh cycle of operations for the carriage.

It is desirable, moreover, to visually indicate to the purchaser that the pellets in the stack he has selected are exhausted and, in effect, to advise him to try another button. I perform this function by means of a "sold out" relay including a coil 666 having a normally open pair of contacts 682 in the hold circuit for said relay. The make circuit for this coil 666 runs from the bus 498 through the lead 520, the normally closed contacts 522 of the extraction relay 524 which has not yet been energized, the lead 526, the lead 534, the normally opened but now closed hold contacts 532 of the vend relay 518, the lead 536, a lead 668, a lead 670, a normally open pair of contacts 672 of the switch 366 (FIG. 7) which is actuated by the cam node 358 while the carriage 328 is returning to its rear idle position, a lead 674, a lead 676, a lead 678, the coil 666 of the "sold out" relay and a lead 680 to the bus 500.

It is to be observed that when the switch 366 is actuated by the cam node 358 a pellet previously will have been dropped on the actuating element 402 causing the vend relay to be deactuated by opening of the contacts 522 unless an exhausted stack in the magazine 112 has been selected. But if an exhausted stack has been selected the vend relay 518 still will be actuated so that at this point in the cycle the "sold out" relay 666 will be energized should the pellets of the selected stack be exhausted. The normally open but now closed hold contacts 682 shunts the contacts 672 so that when the sold out relay is energized it will be held energized even after reopening of the contacts 672 which are only closed for an instant.

The sold out relay is shunted by a lamp 684 which will remain lit so long as the hold relay stays energized. This lamp is in back of a transparent or translucent glass disc on the door 36 having suitable indicia which indicate to the purchaser that the stack of pellets selected has been sold out and that he should select another stack. When another stack is picked that contains pellets, during the ensuing cycle the cup dispensing motor will be energized, the contacts 522 opened, and consequently the sold out relay cut off.

The machine now is ready to commence the actual brewing (extraction of infusion) cycle inasmuch as at this point a cup is on the dispensing platform 304 and a pellet is on the floating seat at the brewing station.

The kicker switch 390 (FIG. 7) includes another normally open pair of contacts 686 which are in the make circuit for the actuating coil 524 of the extraction relay. This circuit runs from the bus 498 through a lead 688, a normally closed pair of contacts 690 controlled by a timer motor 692, a lead 694, a normally closed pair of contacts 696 which can be manually opened by a maintenance man when he is checking the operation of the machine, a lead 698, the coil 524 of the extraction relay, a lead 700, the normally open but now closed pair of contacts 686 which are momentarily closed by the cam node 386 very shortly after the kicker motor starts and a lead 702 to the bus 500. A hold branch is provided for the extraction relay coil 524, said branch paralleling the section of the make circuit including the normally open pair of contacts 686. The hold branch starts at the extraction relay coil 524 and runs through the lead 700, a lead 704, a lead 706, a normally open pair of contacts 708 of the extraction relay which were closed upon energization thereof and a lead 710 to the bus 500. Thereby immediately after completing the make circuit for the extraction relay said make circuit is opened and a hold circuit is completed to maintain energization and ready the extraction relay for deenergization upon opening of the normally closed timer control switch contacts 690. It will be recalled that energization of the extraction relay, which takes place almost immediately after a pellet drops on the actuating element of the extraction switch 400, opens the contacts 522 which results in cutting out the sold out relay and the vend relay. The latter in turn closes the contacts 634 for the cup dispensing motor hold circuit.

Energization of the extraction relay also starts the brewing cycle. However to appreciate the operations performed in the brewing cycle it first is necessary to describe the stand by condition of the components operated during this cycle.

Before the coil 524 of the extraction relay is energized the normally closed contacts 522 of said relay supply power from the bus 498 through the lead 520 and contacts 522 to the lead 526. A lead 712 which in FIG. 28 is interrupted at the arrow X brings power from the lead 526 to the lead 714. Said lead 714 branches to the actuating coils 440, 484 of the solenoids II and IV (FIG. 27) from which leads 716, 718, respectively, run to the bus 500 whereby when the machine 30 is idle and the extraction relay 524 is deenergized the solenoids 440, 484 are energized so that the normally closed valves II and IV are held open. As soon as the extraction relay is energized the contacts 522 open whereby to deenergize the coils 440, 484 thus allowing the valves II and IV to close so that the first step in the brewing cycle is to close these two valves.

When the normally open contacts 686 of the kicker switch 390 close they complete a make circuit for the coil 720 of the water pump relay. This circuit runs from the bus 498 through a lead 722, the coil 720, a lead 724, the lead 704, the now closed contacts 686 and the lead 702 to the bus 500. The contacts 686 are shunted by the hold branch including the lead 704, the hold contacts 708 of the extraction relay and the lead 710.

The water pump relay 720 has a double throw single pole switch including contacts 726, 728 and a blade 730. The blade 730 is biased into engagement with the contact 726 which is connected by a lead 732 to the contact 614 of the upper brewing switch 408 that is actuated by the pin 416 functionally integral with the brewing jaw 144. The blade 612 is biased toward the contact 614 but is held away from the same by the pin 416 when the brewing jaw is in its uppermost position. When the actuating coil 720 of the water pump relay is energized it pulls the blade 730 off the contact 726 and into engagement with the contact 728 thereby completing a make circuit for the water pump 422. This circuit runs from the bus 498 through a lead 734, the contact 728, the blade 730, a lead 736, the water pump motor 422 and a lead 738 to the bus 500. Accordingly, immediately following energization of the extraction relay 524 and consequent energization of the water pump relay 720, the water pump starts.

It should be mentioned at this point that the provision of the water pump and of the water pump relay is optional, the same only being supplied for use where local water pressure is insufficient to operate the hydropneumatic circuit 418.

As noted previously, the extraction relay 524 has a normally open pair of contacts 740 in the timer energization circuit. This circuit runs from the bus 498 through a lead 742, the now closed pair of contacts 740, a lead 744, the timer 692 and a lead 746 to the bus 500. The timer constitutes a motor, such for instance as a synchronous motor, that drives a shaft which operates a switch constituted by the pair of contacts 690. These contacts are normally closed and are arranged so that at the end of the timer cycle they will be momentarily opened and then will snap closed again. Said timer cycle has an adjustable temporal period. Timers of the foregoing type are conventional and may be purchased on the open market. Thereby when the extraction relay contacts 740 are closed the timer will start and within a predetermined period of time thereafter the contacts 690 will open to cut out the extraction relay and will reclose to prepare said relay for its subsequent actuation. This period of time preferably is adjustable between approximately 5 and 15 seconds. Obviously, when the extraction relay is cut out the timer motor is stopped.

As noted above, energization of the extraction relay and opening of the extraction relay contacts 522 deenergized the solenoids 440, 484 and therefore closed the valves II and IV (FIG. 27). At the same time that this takes place the valve I which is normally closed, is opened. The energizing circuit for the valve I runs from the bus 498 through the lead 742, the normally opened but now closed pair of extraction relay contacts 740, the lead 744, a lead 748 and lead 750 to the solenoid 430 for the normally closed valve I. The solenoid 430 is connected by a lead 752 to the bus 500.

It will be recalled that with the valves II, III and IV closed and the valve I open the unbalanced hydraulic pressure on the spindle 146 will move the brewing jaw 144 downwardly so as to close the brewing compartment 222, locking the pellet 98 therein and piercing the upper and lower flat walls of the pellet.

Figure 3:
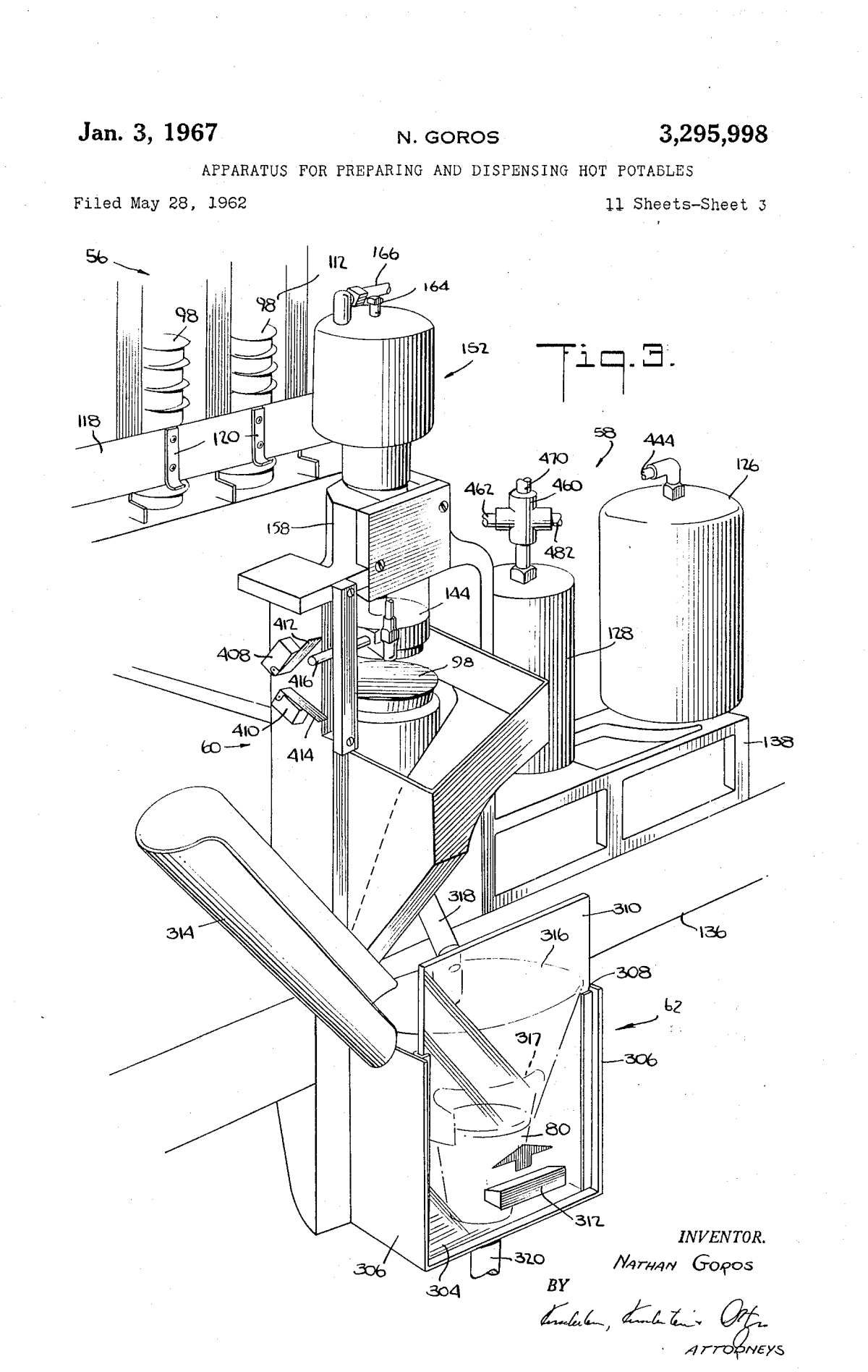

When the brewing jaw reaches the lower limit of its travel the pin 416 will engage the actuating plate 414 of the lower brewing switch 410 (FIG. 3). Said lower switch has a normally open pair of contacts 754 which upon closure as the brewing jaw reaches its lowermost position, completes a circuit for energizing the solenoid 454 of the normally closed valve III. This circuit runs from the bus 498 through the lead 742, the now closed pair of contacts 740, the lead 744, the lead 748, a lead 756, the now closed pair of contacts 754, a lead 758, the solenoid 454 and a lead 760 to the bus 500. A branch circuit simultaneously energizes the air pump 468. This circuit takes power from the lead 758 through a lead 762 that is connected to the air pump, the air pump in turn being connected by a lead 764 to the bus 500. Hence when the brewing jaw 144 reaches its lowermost position the valve III is opened whereby water will be pneumatically forced from the flash heating tank 128 through the valve III to the brewing jaw so as to brew and dispense an individual portion of a hot potable.

Eventually, after the preset period of operation, the timer motor will momentarily open the normally closed timer contacts 690. Opening these contacts opens the energizing circuit for the extraction relay 524 so that this relay is deenergized and all of its contacts reversed to the idle condition. The contacts 740 open so as to stop the timer. The contacts 708 open so as to maintain the extraction relay open upon reclosure of the timer contacts 690 and the contacts 522 reclose. When the contacts 740 open, the valves I and III are biased back to closed condition and when the contacts 522 close, the valves II and IV are opened by their respective solenoids. It will be recalled that reversal of the conditions of said valves elevates the brewing jaw 144 and fills the flash heating tank 128 thereby restoring the machine to its standby condition.

It will be observed that when the extraction relay 524 is opened at the end of a timer cycle the water pump relay 720 likewise is deenergized. This permits the switch blade 730 to swing off the contact 728 which opens the make circuit for the water pump 422. However if tap pressure were too low to raise the brewing jaw the machine would be disabled; hence in order to continue the water pump in operation until the brewing jaw reaches its uppermost position, an alternate circuit is provided for the water pump. This circuit runs from the bus 498 through the lead 632, the normally closed contacts 634 of the vend relay 518 (which relay now is deenergized by opening of the contacts 510), the lead 636, the lead 616, the blade 612 of the upper brewing switch 408 which since the pin of the brewing jaw is off said switch now is biased into engagement with the contact 614 the lead 732, the contact 726 against which the blade 730 now rests because the water pump relay is idle, the lead 736, the water pump motor 422 and the lead 738 to the bus 500. As soon as the brewing jaw reaches its uppermost position the pin 416 forces the blade 612 of the upper brewing switch 408 off the contact 614 to open the water pump circuit and said blade engages the contact 610 to prepare the make circuit for a subsequent cycle of operations of the cup dispensing motor 82.

The resistance heater 130 for the reserve tank 126 is energized from the bus 498 through a lead 766, said heater 130, a lead 768, the thermostatically controlled contacts 134 which are regulated by the temperature of the water in said tank and a lead 770 to the bus 500. Although the water in the tank will be maintained at the temperature at which the thermostat is set, e.g., 140° F. to 160° F., it will be observed that this operation is independent of the automatic cycling.

The resistance heater 132 for the small heating tank 128 is energized from the bus 498 through a lead 772, a pair of thermostatically controlled contacts 774, a lead 776, the heating coil 132 and a lead 778 to the bus 500. The thermostat which controls the contacts 774 is in heat conducting relationship with the water in the flash heating tank and will maintain this water at a suitable temperature as noted above, e.g., about 160° F. in the absence of automatic cycling, or above 190° F. regardless of automatic cycling.

If flash heating is to be employed, the thermostatically controlled contacts 774 hold the temperature of the water in the small tank 128 at 140° F. to 160° F. and are shunted by a pair of normally open contacts 780 that are closed upon energization of the extraction relay 524. Thereby shortly after a pellet is deposited on the floating seat 238 (or 268) at the brewing station the flash, i.e., topping, heater will be energized and it will remain energized until the extraction relay is deenergized upon the completion of a brewing cycle by opening of the timer contacts 690. Alternatively the contacts 780 are omitted and the thermostatic contacts 774 hold the water in the small tank at a temperature above 180° F., e.g., about 195° F.

Attention already has been called to the two manually operable momentary switches 528 and 696 which are located within the casing 32 for access to the operator when the wishes to check the machine. I also provide another manually operable momentary switch constituting a normally open pair of contacts 782 which when closed shunt the normally open pair of contacts 604 of the extraction switch. Preferably the switches 538 and 782 are ganged so that when the contacts 538 are closed by the operator the contacts 782 likewise will be closed.

The foregoing automatic cycling circuit is extremely reliable and efficient in operation and, considering the number of operations which it must control, is relatively simple. It will be appreciated that it has several safeguards which insure the proper sequence of operation and the making and opening of various branches of the circuit at the proper moments. It also is so constituted that if certain operations fail the machine will not damage itself. For example, if the pellet should jam on the kicker platform the contacts 604 would remain closed and the extraction relay 524 would remain energized whereby the valves I and III would remain open and the valves II and IV would remain closed, so that repeated attempts would not be made to reopen and close the jaws.

The heating coils 130, 132 are so selected that the individual power requirement for each is short of 1,650 watts. That is to say, each of these coils draws less than 15 amps at 110 volts. However, because, as shown in FIG. 28, the two coils 130, 132 are connected in parallel across the main buses 148, 500 and because both coils may be energized simultaneously, the convenience outlet receptacle to which the leads 490, 492 are connected would have to be on a heavy duty branch of the building wiring main which is capable of supplying 30 amps or more.

It may be mentioned at this point that the total power requirement of the machine, with both heating coils energized and with all solenoids, relays and motors energized which could operate at any given time, does not exceed 30 amps since the actual resistance values of the heating coils are so selected as to total less than 30 amps by the additional amperage needed for motors, solenoids and relays that can be simultaneously operated.

Nevertheless, it is a disadvantage to require the machine to be connected to a heavy duty convenience outlet since in many buildings and in many locations only 15-amp outlets are available and the installation of the machine under these circumstances would necessitate running a special heavy duty line to the location for the machine.

In accordance with an ancillary feature of my invention I have avoided the possible requirement for a new heavy duty line and have enabled the machine to be plugged into the ubiquitous 15-amp convenience outlets by modifying the circuit in the manner shown in FIG. 29.

In said modified circuit the resistance values of the heating coil 132 and of the heating coil 130' are made substantially equal and each is made sufficiently high to draw less than 15 amps by an amount at least equal to the maximum current drain of all the motors, solenoids and relays which can be actuated at any one time. Preferably, the coils and electric elements are designed for a maximum current consumption at any given time that does not exceed ten amperes. Therefore, if no more than one of the heating coils 130', 132 is energized at any given time the current consumption of the circuit will not exceed 15 amps and the machine can be connected to a 15-amp line. The heating coil 132 is, of course, the heating coil for the small capacity heating tank 128. The heating coil 130' is a heating coil for the standby tank, i.e., the storage tank 126. The circuit for energizing the heating coil 130' for the storage tank runs from the bus 498 to the bus 500. However, this energization circuit for the coil 130' in contrast to the energizing circuit for the heating coil 130 which includes in it only the thermostat contacts 134, includes additional contacts now to be described.

More specifically, the energizing circuit for the heater 130' runs from the bus 498, through a lead 784 (see FIG. 29), a pair of contacts 786, a lead 788, a pair of contacts 790, a lead 792, the heater coil 130', a pair of thermostat contacts 134' and a lead 794 to the bus 500. The contacts 786 are operated by the extraction relay 524 and normally are closed, that is to say, the contacts 786 are closed when the extraction relay 524 is unactuated and said contacts are opened from energization of said extraction relay. The contacts 790 are mechanically connected to the thermostat controlled contacts 774 of the small capacity heating tank in such a manner that when the contacts 774 are closed the contacts 790 are opened. The thermostat contacts 134' are controlled by the temperature of the water in the standby (storage) tank.

It now will be seen that the heating coil 130′ will have its energization circuit automatically opened at any time that the energization circuit for the heating coil 132 of the small tank is completed. More particularly, if the temperature of the water in the smaller tank 128 falls before a predetermined minimum causing the contacts 774 to close, the contacts 790 will open. When upon energization of the extraction relay 524 the contacts 780 close, the contacts 786 will open. Therefore it never is possible to have both heating coils 130′, 132 energized concurrently; that is to say, actuation (energization) of the heating coil 132 cuts out the heating coil 130′ even if the thermostatic contacts 134′ should be closed.

It will be appreciated that with the foregoing modification the machine never will draw in excess of 15 amps (except for momentarily overloading of a line upon starting of a motor which can be taken care of by a fuse capable of handling temporary overloads) so that the machine does not require the presence of a heavy duty outlet, i.e., an outlet supplying more than 15 amps.

It thus will be seen that I have provided a machine which achieves the several objects of my invention, and which is well adapted to meet the conditions of practical use.

As various possible embodiments might be made of the above invention, and as various changes might be made in the embodiments set forth, it is to be understood that all matter herein set forth or shown in the accompanying drawings is to be interpreted as illustrative and not in a limiting sense.

Having thus described my invention, I claim as new and desire to secure by Letters Patent,

1. In a machine for dispensing an individual portion of a potable upon each actuation of the machine, the combination of: a tank the fluid capacity of which is substantially equal to an individual portion of the potable, a dispensing station, a brewing station connected directly to the dispensing station, a source of water, a first conduit means connecting said source of water to said tank, a second conduit means connecting said tank directly to said brewing station, means in the first conduit means for selectively isolating the source of water from the tank, means in the second conduit means for selectively isolating the brewing station from the tank, and fluid means for applying pressure to the water in the tank when the tank is isolated from the source of water and is connected to the brewing station so as to empty the tank through the brewing and dispensing stations, said fluid means being inoperative to apply such pressure when the tank is connected to the source of water and is isolated from the brewing station.

2. In a machine for dispensing an individual portion of a potable upon each actuation of the machine, the combination of: a tank the fluid capacity of which is substantially equal to an individual portion of the potable, a dispensing station, a brewing station connected directly to the dispensing station, a source of water, a first conduit means connecting said source of water to said tank, a second conduit means connecting said tank directly to said brewing station, means in the first conduit means for selectively isolating the source of water from the tank, means in the second conduit means for selectively isolating the brewing station from the tank, a third conduit means connecting said tank to the atmosphere, means in the third conduit means for selectively isolating the tank from the atmosphere, and means for applying pneumatic pressure to the water in the tank when the tank is isolated from the source of water and from the atmosphere and is connected to the brewing station so as to empty the tank through the brewing and dispensing stations, said pneumatic means being inoperative to apply such pressure when the tank is connected to the atmosphere and to the source of water and is isolated from the brewing station.

3. In a machine for dispensing an individual portion of a hot potable upon each actuation of the machine, the combination of: a tank the fluid capacity of which is substantially equal to an individual portion of the hot potable, means to heat the water in the tank, a dispensing station, a brewing station connected directly to the dispensing station having an idle and an operable condition, a source of water, a first conduit means connecting said source of water to said tank, a second conduit means connecting said tank directly to said brewing station, means in the first conduit means for selectively isolating the source of water from the tank, means in the second conduit means for selectively isolating the brewing station from the tank, and means for applying pneumatic pressure to the water in the tank when the tank is isolated from the source of water and is connected to the brewing station and the brewing station is in operable condition so as to empty the tank through the brewing and dispensing stations, said pneumatic means being inoperative to apply such pneumatic pressure when the tank is connected to the source of water and is isolated from the brewing station and the brewing station is in idle condition.

4. A machine for dispensing a potable, said machine comprising, a dispensing station, a brewing station connected directly to the dispensing station, a tank the volumetric capacity of which is approximately equal to an individual portion of the potable, a source of water, first conduit means connecting the source of water to the tank, means in the first conduit means for isolating the source of water from the tank, second conduit means connecting the tank directly to the brewing station, means in the second conduit means for isolating the brewing station from the tank, a source of air under pressure, a third conduit means connecting the source of air under pressure with the tank, isolation means associated with the third conduit means, said several isolation means being constructed and arranged when the brewing station is operable to isolate the tank from the source of water, to connect the source of air under pressure to the tank and to connect the tank to the brewing station so that the source of air under pressure will force all of the water in the tank out of the brewing and dispensing stations and blow the water through the second conduit means out of the brewing and dispensing stations whereby to clean out the second conduit means and the brewing and dispensing stations each time that a potable is dispensed.

5. A machine as set forth in claim 4, wherein the brewing station has two cooperating brewing jaws, and wherein a container in which flavoring material for a single individual portion of the potable is disposed is located between said jaws so that when water leaves the tank on its way toward the dispensing station it is introduced to and forced through the container under elastic air pressure.

6. A machine as set forth in claim 5, wherein the container is a pellet having frangible walls, and wherein the flavoring material is particulate so that the water will gradually wet down such flavoring material under the elastic air pressure before being forced through the pellet.

7. In a machine for dispensing a potable, a pair of jaws, means mounting said jaws for relative movement toward and away from one another, said jaws forming a compartment when they are closed together, means for moving said jaws toward and away from one another, said means comprising a pair of functionally integral pistons of different diameters in cooperating cylinders, means for supplying water under pressure continuously to the outer face of the smaller piston, means selectively supplying water under pressure to the outer face of the larger piston, said jaws being moved toward one another when the water under pressure is supplied to the larger piston and being moved apart when no water under pressure is supplied to the larger piston, a tank, means connecting the cylinder in which the larger piston operates to the tank when the larger piston is disconnected from water under pressure whereby when the jaws are moved apart the water from the larger piston is forced into the tank, means connecting the tank to one of the jaws, and a valve in said last-named connecting means which is opened when the jaws are brought together.

8. A combination as set forth in claim 7 wherein the machine dispenses an individual portion of a potable upon each actuation of said machine and wherein the volume of water swept out by the larger piston as the jaws move between their extreme positions is approximately equal to an individual portion of the potable to be dispensed.

9. A combination as set forth in claim 7 wherein there is provided a reserve tank interposed in the means connecting the cylinder to the first mentioned tank.

10. A combination as set forth in claim 9 wherein the reserve tank is larger than the first mentioned tank and wherein the first mentioned tank has a fluid capacity substantially equal to an individual portion of the potable.

11. A combination as set forth in claim 9 wherein there are provided selectively operable means for isolating the reserve tank from the first mentioned tank, a source of air under pressure, and means to connect said source of air under pressure to the first mentioned tank when the jaws are brought together.

12. A combination as set forth in claim 11 wherein there is provided means connecting the first mentioned tank to the atmosphere, and valve means is included in the last named connecting means which valve means is open when water is transferred to the tank from the cylinder for the larger piston and is closed when the source of air under pressure is connected to the first mentioned tank.

13. In a machine for automatically preparing and dispensing a potable, in combination with a magazine containing several stacks each of which includes a plurality of individual discrete pellets containing flavoring material: a brewing station, means for abstracting a single package at a time from any selected stack in the magazine and delivering it to the brewing station, a tank containing liquid, a metering arrangement connected to said tank and to said brewing station for delivering from the tank to the brewing station an amount of liquid approximately equal to an individual portion of the potable, and electric circuit means including a manually operable control switch which when actuated operates the means for abstracting a package from the magazine and delivering it to the brewing station and thereafter operates the metering arrangement to deliver an individual portion of the liquid to the brewing station.

14. A machine for brewing a potable, said machine comprising a group of individual discrete pellets containing flavoring material, a normally empty brewing station, means for abstracting a pellet from the group and delivering it to the empty brewing station, said brewing station including a pair of jaws, means mounting the jaws for movement toward and away from one another and power means energized to move the jaws into sealing engagement with one another around a pellet delivered to the empty brewing station, a source of liquid, a metering arrangement for delivering to the brewing station an amount of liquid approximately equal to the individual portion of the potable, the metering arrangement being energized upon closure of the jaws, and a timing arrangement for opening the jaws after a predetermined period.

15. In a machine for dispensing potables, a magazine containing plural groups of different packages, said groups being arranged side-by-side, means for abstracting only one package at a time from any selected group, the points of discharge of packages from the different groups being arranged side-by-side, a single intermediate station, means for transversely shifting a package abstracted from any selected group to said single intermediate station, a brewing station having jaws that are relatively moved from a spaced apart position into sealed relationship defining a brewing compartment, means to flow hot water through the brewing compartment when the jaws are in sealed relationship, and means for transferring a selected package from the intermediate station to the brewing station while the jaws are spaced apart.

16. In a system for dispensing potables, the combination of: a magazine containing a plurality of individual single portion discrete flavor-containing packages, an intermediate station, means for abstracting one package at a time from the magazine and delivering the same to an intermediate station, a brewing station at the same horizontal plane as the intermediate station, said brewing station having jaws that are relatively moved from a spaced apart position into sealed relationship defining a brewing compartment, means to flow hot water through the brewing compartment when the jaws are in sealed relationship, and means for transporting a package from the intermediate station horizontally to the brewing station.

17. In a machine for dispensing potables, the combination of: a magazine containing separate plural groups of individual discrete pellets of circular plan configuration, means for abstracting a single pellet at a time from any selected one of said groups, all of said magazines having points of delivery in a common horizontal plane, a gravity chute having its entrance end in said plane and extending across all of the delivery ends of the groups, said gravity chute extending downwardly from said entrance end to a lower discharge end, the sides of said chute converging to said discharge end, and erect flanges on the sides of the chute by which the packages are transversely inwardly shifted so that a package delivered from any one of the groups will be delivered to a single common location at the discharge end of the chute.

18. In a machine for dispensing potables, the combination of: a magazine containing separate plural groups of individual discrete pellets of circular plan configuration, means for abstracting a single pellet at a time from any selected one of said groups, all of said magazines having points of delivery in a common horizontal plane, a gravity chute having its entrance end in said plane and extending across all of the delivery ends of the groups, said gravity chute extending downwardly from said entrance end to a lower discharge end, the sides of said chute converging to said discharge end, erect flanges on the sides of the chute by which the packages are transversely inwardly shifted so that a package delivered from any one of the groups will be delivered to a single common location at the discharge end of the chute, and a pair of upwardly converging walls in the center of the chute to divert toward the sides of the chute pellets delivered from groups near the center of the chute whereby to impede the travel of such pellets as they travel downward on the chute.

19. In a machine for dispensing potables, the combination of: a magazine containing separate plural groups of individual discrete pellets of circular plan configuration, means for abstracting a single pellet at a time from any selected one of said groups, all of said magazines having points of delivery in a common horizontal plane, a gravity chute having its entrance end in said plane and extending across all of the delivery ends of the groups, said gravity chute extending downwardly from said entrance end to a lower discharge end, the sides of said chute converging to said discharge end, said discharge end of the chute comprising a semicircular downwardly converging funnel shaped section against which the sides of the pellets brush as they fall therethrough, and erect flanges on the sides of the chute by which the packages are transversely inwardly shifted so that a package delivered from any one of the groups will be delivered to a single common location at the discharge end of the chute.

20. In an apparatus for brewing a potable, a pair of brewing jaws, means mounting said jaws for relative movement toward and away from one another to form or open a brewing compartment, a set of downwardly extending angled tines carried by the top jaw, a set of upwardly extending angled tines carried by the lower jaw, said tines being adapted to pierce the upper and lower surfaces of a frangible pellet containing flavoring-material, said pellet being insertable between said jaws, a groove in the lower face of the upper jaw within the zone defined by the tines carried by said upper jaw, said groove being located above the tines carried by the upper jaw and defining a plenum chamber, and a passageway extending from said groove to an external surface of said upper jaw for connection to a source of supply of brewing liquid.

21. In an apparatus for brewing a potable, a pair of brewing jaws, means mounting said jaws for relative movement toward and away from one another to form or open a brewing compartment, means providing a discharge opening in the bottom wall of said brewing compartment, said entire bottom wall being sloped downwardly from its periphery toward said discharge opening, a set of downwardly extending angled tines carried by the top jaw, a set of upwardly extending angled tines carried by the lower jaw, said tines being adapted to pierce the upper and lower surfaces of a frangible pellet containing flavoring-material, said pellet being insertable between said jaws, an annular groove in the lower face of the upper jaw within the zone defined by the tines carried by said upper jaw, said groove being located above the tines carried by the upper jaw and defining a plenum chamber, and a passageway extending from said groove to an external surface of said upper jaw for connection to a source of supply of brewing liquid.

22. In a machine for dispensing liquid potables, which machine includes a brewing compartment constituted of an upper and a lower jaw relatively movable toward and away from one another and which brewing compartment is adapted to have sealed therein between said jaws a pellet having frangible top and bottom walls and containing a flavoring material, the top jaw including angled downwardly extending tines and the lower jaw including angled upwardly extending tines for piercing said walls of the pellet: that improvement comprising plural tubular cylindrical sleeves of different diameters, each of said sleeves constituting an endless band which forms a side wall of the sleeve with the width of the band parallel to the direction of relative movement of the jaws, means supporting said sleeves in concentric relationship in one of said jaws, the edges of the sleeves remote from the supporting means having the tines integrally formed thereon.

23. In a machine for dispensing liquid potables, a brewing compartment constituted of an upper and a lower jaw relatively movable toward and away from one another and which brewing compartment is adapted to have sealed therein between said jaws a pellet having frangible top and bottom walls and containing a flavoring material, the top jaw including angled downwardly extending tines and the lower jaw including angled upwardly extending tines for piercing said walls of the pellets the tines of at least one of said jaws being composed of plural interlocked intersecting partitions having tines formed along the edges of the partitions facing the pellet, said tines being angled to the planes of the partitions.

24. In a machine for brewing and dispensing at each cycle only a single portion of a potable by passage of a liquid through a package containing flavoring material, that improvement comprising: a source of fluid under pressure, a brewing compartment spaced from said source of fluid and dimensioned to brew an individual portion of the potable at each brewing cycle, a dispensing station spaced from the brewing compartment and including a permanently open spout and a platform for supporting a cup to receive the individual portion of the potable from the spout, conduit means connecting the source of fluid under pressure to the brewing compartment, conduit means directly connecting the brewing compartment to the dispensing station, and means for flushing said fluid through both said conduit means, the brewing compartment and the dispensing station after the conclusion of a brewing cycle so as to then clean both said conduit means, the brewing compartment and the dispensing station.

25. A combination as set forth in claim 24 wherein the fluid under pressure is air.

26. A combination as set forth in claim 25 wherein a high temperature heating element is included in direct contact with and to heat the air which flushes out both conduit means, the brewing compartment and the dispensing station, to a temperature forming steam in combination with the liquid previously present whereby to steam out and thus sterilize both conduit means, the brewing compartment and the dispensing station at the conclusion of a brewing operation.

27. In a machine for dispensing a hot potable, a hydraulic system comprising, in combination, a reserve tank, thermostatically controlled heating means for maintaining the water in said tank at a temperature not exceeding 180° F., a smaller heating tank having a capacity approximately equal to the amount of potable to be dispensed as an individual portion, thermostatically controlled heating means to maintain the water in said smaller tank at a temperature not exceeding 180° F., a source of water, conduit means connecting said source of water to the reserve tank, conduit means connecting the reserve tank to the smaller tank, a brewing station, a third conduit means connecting the smaller tank to the brewing station, valve means in the third conduit means, means to bypass the thermostatic control of the second heating means so as to continuously operate the second heating means when the valve means is open, a check valve in the conduit means between the two tanks and permitting flow of water from the reserve tank to the smaller tank, and means for applying fluid pressure to the water in the smaller tank when the valve means in the third conduit means is open.

28. A machine for brewing a potable, said machine comprising a group of individual discrete pellets containing flavoring material, a normally empty brewing station, means for abstracting a pellet from the group and delivering it to the empty brewing station, said brewing station including a pair of jaws, means mounting the jaws for movement toward and away from one another and power means energized to move the jaws into sealing engagement with one another around a pellet delivered to the empty brewing station, a source of liquid, a metering arrangement for delivering to the brewing station an amount of liquid approximately equal to the individual portion of the potable, the metering arrangement being energized upon closure of the jaws, a timing arrangement for opening the jaws after a predetermined period, a source of supply of cups, and actuating means for delivering a cup from said source of cups to a dispensing station when the means for abstracting a pellet from the group is actuated.

29. In a machine for dispensing potables, a magazine containing plural packages, means for abstracting one package at a time from the magazine and delivering said package to an intermediate station, a brewing station in the same horizontal plane as the intermediate station, the brewing station including a lower stationary jaw and an upper movable jaw, means energized upon delivery of a package to the intermediate station to transport the package to the lower jaw, a cup dispensing unit, a dispensing platform, and means energized upon abstraction of a package from the magazine and transport thereof to the lower jaw to energize the cup dispensing unit and conduct a cup therefrom to the dispensing platform.

30. A machine as set forth in claim 29 which further includes a metering system for delivering individual portions of liquid, a conduit connecting the metering system to the brewing jaws, and means operable to actuate the metering system upon closure of the jaws.

31. In a machine for dispensing liquid potables, which machine includes a brewing compartment constituted of an upper and a lower jaw relatively movable toward and away from one another and which brewing compartment is adapted to have sealed therein between said jaws a pellet having frangible top and bottom walls and containing a flavoring material, the top jaw including angled downwardly extending tines and the lower jaw including angled upwardly extending tines for piercing said walls of the pellet: that improvement comprising plural sleeves of different diameters, means supporting said sleeves in concentric relationship in one of said jaws, the edges of the sleeves remote from the supporting means having the tines integrally formed thereon, said supporting means constituting a spider having plural arms each of which includes several grooves for receiving the sleeves.

References Cited by the Examiner

UNITED STATES PATENTS

| | | | |
|---|---|---|---|
| 474,064 | 5/1892 | Piccard. | |
| 818,481 | 4/1906 | Spencer | 222—373 X |
| 823,446 | 6/1906 | Shuster | 146—60 |
| 936,101 | 10/1909 | Edwards | 146—61 |
| 1,555,338 | 9/1925 | Vaughan. | |
| 1,816,829 | 8/1931 | De Leeuw | 121—45 X |
| 1,895,710 | 1/1933 | Ernst. | |
| 1,954,147 | 4/1934 | Schroyer. | |
| 2,153,407 | 4/1939 | Bell | 146—169 |
| 2,778,739 | 1/1957 | Rodth | 99—295 X |
| 2,848,939 | 8/1958 | Warner | 100—215 X |
| 2,883,922 | 4/1959 | Andres | 99—295 X |
| 2,887,038 | 5/1959 | Rosander | 99—283 |
| 2,898,843 | 8/1959 | Rockriver | 99—283 |
| 2,899,886 | 8/1959 | Rodth | 99—295 |
| 2,901,964 | 9/1959 | Johnson | 99—357 X |
| 2,939,381 | 6/1960 | McBride | 99—295 |
| 2,969,451 | 1/1961 | Logan. | |
| 2,976,710 | 3/1961 | Sisson | 68—208 |
| 3,000,539 | 9/1961 | Danziger | 221—29 |
| 3,100,434 | 8/1963 | Bunn | 99—282 |

WALTER A. SCHEEL, *Primary Examiner.*

J. B. BEIN, ROBERT E. PULFREY, *Examiners.*

S. P. FISHER, *Assistant Examiner.*